(12) United States Patent
Turkowski et al.

(10) Patent No.: US 11,005,519 B1
(45) Date of Patent: May 11, 2021

(54) ISOLATION METHODS FOR FULL-DUPLEX ANTENNA SYSTEMS

(71) Applicant: UTVATE Corporation, San Francisco, CA (US)

(72) Inventors: Stefan William Turkowski, Oakland, CA (US); Amin Reda, Oakland, CA (US); Siamak Ebadi, San Francisco, CA (US); Andres Felipe Osorio, Emeryville, CA (US)

(73) Assignee: UTVATE Corporation, San Francisco, CA (US)

( * ) Notice: Subject to any disclaimer, the term of this patent is extended or adjusted under 35 U.S.C. 154(b) by 0 days.

(21) Appl. No.: 17/120,021

(22) Filed: Dec. 11, 2020

Related U.S. Application Data

(60) Provisional application No. 63/072,447, filed on Aug. 31, 2020, provisional application No. 63/019,228, (Continued)

(51) Int. Cl.
*H04B 1/50* (2006.01)
*H04B 7/0408* (2017.01)
(Continued)

(52) U.S. Cl.
CPC ............. *H04B 1/50* (2013.01); *H04B 1/66* (2013.01); *H04B 7/0408* (2013.01); *H04B 7/18528* (2013.01); *H04L 5/14* (2013.01)

(58) Field of Classification Search
CPC .......... H04B 1/38; H04B 1/3827; H04B 1/40; H04B 1/50; H04B 1/66; H04B 7/0408;
(Continued)

(56) References Cited

U.S. PATENT DOCUMENTS

| | | | |
|---|---|---|---|
| 8,649,418 B1* | 2/2014 | Negus ................ | H04B 7/0486 375/211 |
| 2012/0243447 A1* | 9/2012 | Weissman ............ | H04B 1/109 370/280 |

(Continued)

OTHER PUBLICATIONS

U.S. Appl. No. 16/858,691, filed Apr. 26, 2020 "Antenna Modules in Phase Array Antennas."

*Primary Examiner* — Young T. Tse
(74) *Attorney, Agent, or Firm* — Cognition IP, P.C.; Edward Steakley

(57) ABSTRACT

Disclosed embodiments relate to isolation methods for full-duplex communication. In one example, a full-duplex antenna system includes a Tx (transmit) signal path including one or more elements each, means a power amplifier, one or more filters, and a Tx port of a Tx patch antenna operating at a Tx frequency band to transmit an outgoing signal to a satellite, the one or more elements each further including an Rx (receive) signal path including a low noise amplifier driven by an Rx port of an Rx patch antenna operating at an Rx frequency band to receive an incoming signal from the satellite, the Rx frequency band being separated by a guard band from the Tx frequency band, wherein the filters together with a physical separation between the Tx and Rx signal paths provide sufficient isolation to reduce coupling between the Tx signal path and the Rx signal path, allowing the full-duplex antenna system to operate in full-duplex.

27 Claims, 33 Drawing Sheets

Related U.S. Application Data filed on May 1, 2020, provisional application No. 63/060,101, filed on Aug. 2, 2020.

(51) Int. Cl.
  *H04L 5/14* (2006.01)
  *H04B 1/66* (2006.01)
  *H04B 7/185* (2006.01)

(58) Field of Classification Search
  CPC .... H04B 7/10; H04B 7/1851; H04B 7/18523; H04B 7/18528; H04B 7/2853; H04B 7/28532; H04B 7/28534; H04L 5/14; H04L 5/1423; H01P 1/202; H01P 1/2039; H01P 1/205; H01P 1/208; H01P 1/213; H01P 1/2131; H01P 1/2136; H01Q 3/26; H01Q 21/06; H01Q 21/08
  USPC ....... 375/144, 148, 219, 220, 222, 259–262, 375/265, 267, 268, 279, 284, 285; 370/275, 278, 282, 295, 297; 343/725, 343/729, 756, 833, 834, 850, 853, 908, 343/909; 455/427, 12.1, 13.3, 13.4, 25, 455/63.4
  See application file for complete search history.

(56) References Cited

U.S. PATENT DOCUMENTS

| | | | |
|---|---|---|---|
| 2018/0139626 A1* | 5/2018 | Ashworth | H04B 7/14 |
| 2019/0158154 A1* | 5/2019 | Na | H04B 7/0404 |
| 2019/0252796 A1 | 8/2019 | Mahanfar et al. | |
| 2020/0099144 A1* | 3/2020 | Liu | H04B 1/0064 |
| 2020/0279829 A1* | 9/2020 | Elsherbini | H01L 25/065 |

* cited by examiner

Tx Antenna Position with respect to Rx Antenna

ISOLATION METHODS FOR FULL-DUPLEX ANTENNA SYSTEMS

CROSS-REFERENCE TO RELATED APPLICATIONS

This application claims the benefit of U.S. Provisional Application 63/019,228, filed May 1, 2020, which is hereby incorporated by reference in its entirety. This application also claims the benefit of U.S. Provisional Application No. 63/060,101, filed Aug. 2, 2020, which is also hereby incorporated by reference in its entirety. This application also claims the benefit of U.S. Provisional Application No. 63/072,447 filed Aug. 31, 2020 which is also hereby incorporated by reference in its entirety.

TECHNICAL FIELD

Aspects of the disclosure are related to the field of full-duplex beam-scanning antenna systems, and, more particularly, to isolation methods and beam-scanning antenna systems for full-duplex communication.

BACKGROUND

The wireless revolution has resulted in ever-increasing demands on our limited wireless spectrum. Enabling full-duplex satellite communications, as compared to half-duplex, promises to improve the use of the limited wireless spectrum, and increase satellite communications throughput while maintaining the same antenna footprint. As used herein, the term full duplex describes simultaneous data transmission and reception from a single antenna. In other words, a full-duplex antenna system is capable of simultaneous bi-directional data transmissions. Half-duplex devices can only transmit in one direction at a time, where data can move in two directions, but not at the same time. Unfortunately, at least some of the power of the transmit signal can be radiated back into the circuitry of the receive portion. Transmitted signals are typically transmitted at fairly high-power levels. Received signals, however, are typically received at very low power levels. The signal energy fed back from the Tx signal can be greater than a noise floor of the Rx signal or worse, greater than the power of the Rx signal itself, thereby interfering with the Rx signal being reliably received. Reducing such coupling can improve the reliability of the received signal during full-duplex operation.

SUMMARY

One or more embodiments described herein, among other benefits, solve one or more of the foregoing problems in the art by providing full duplex antenna systems, and isolation methods to reduce the coupling from a transmit signal path onto a receive signal path, and to thereby allow full-duplex communication at a maximum allowable data rate. In one embodiment, a full duplex antenna system includes a controller, a transmit signal path including one or more elements each including a distribution network, a power amplifier, one or more filters, and a transmit port of a transmit patch antenna operating at a transmit frequency bandwidth to transmit an outgoing signal to a satellite. The example full duplex antenna system further includes a receive signal path with one or more elements, the receive signal path including a low noise amplifier and a distribution network, the low noise amplifier is driven by a receive port of a receive patch antenna operating at a receive frequency bandwidth to receive an incoming signal from the satellite. The receive frequency bandwidth is separated by a frequency guard band from the transmit frequency bandwidth, and wherein the total isolation $I_{total}$ between the transmit signal path and the receive signal path is attained by a combination of filtering isolation $I_{filtered}$ and coupling isolation $I_{coupled}$. $I_{total}$ provides sufficient isolation to reduce coupling between the transmit signal path and the receive signal path to allow the antenna system to operate in full-duplex mode with the same electrical performance as if it were two well-isolated half-duplex panels.

Additional features and advantages of the present application will be set forth in the description which follows, and in part will be obvious from the description, or may be learned by the practice of such example embodiments.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

Figure 1:
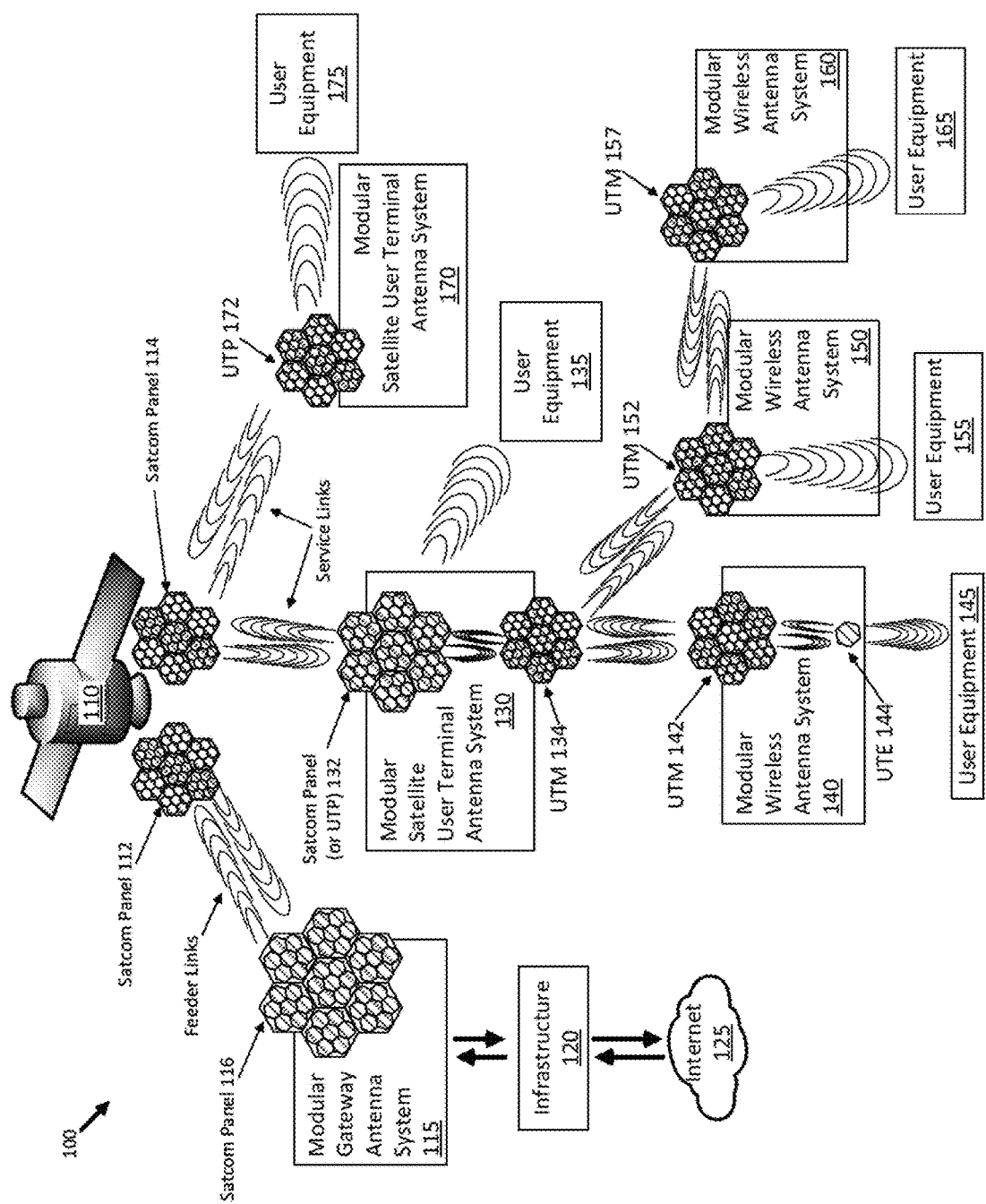
FIG. 1 depicts a block diagram illustrating a general overview and architecture of an example satellite communication system including various full-duplex modular antenna array systems, according to some implementations.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may include systems, processes, apparatuses, machine-implemented methods, computing devices, or computer readable medium.

As used herein, a Tx panel and Rx panel can also sometimes be referred to as Tx antenna aperture and Rx antenna aperture. Additionally, a single Tx or Rx layer of an antenna is sometimes referred to as a patch, or antenna, or patch antenna, or microstrip patch antenna, or layer, or aperture. Furthermore, a full-duplex patch antenna in some examples, includes a Tx layer, an Rx layer, and a ground layer, the layers being parallel to each other, and spaced apart from each other in a planar substrate made of a dielectric material, such as a printed circuit board (PCB). Patch layers can be connected using vias.

As discussed above, in a full-duplex satellite communication scenario, at least some of the power of the transmit signal can be unfortunately radiated back into the receive portion of the circuitry. Transmitted signals are typically transmitted at fairly high power levels. Received signals, however, are typically received at very low power levels. The fed-back signal energy from the Tx signal can be greater than a noise floor of the Rx signal, thereby interfering with the Rx signal being reliably received. Reducing such coupling can improve the reliability of the received signal during full-duplex operation. One or more embodiments described herein, among other benefits, solve one or more of the foregoing problems in the art by providing full-duplex antenna systems and isolation methods to reduce coupling from a transmit signal path onto a receive signal path, and to thereby allow full-duplex communication. In one embodiment, a full-duplex antenna system includes a controller, a transmit signal path including one or more elements each including a distribution network, a power amplifier, one or more filters, and a transmit port of a transmit patch antenna operating at a transmit frequency band to transmit an outgoing signal to a satellite. The example full-duplex antenna system further includes a receive signal path in the one or more elements, the receive signal path including a distribution network, a low noise amplifier driven by a receive port of a receive patch antenna operating at a receive frequency band to receive an incoming signal from the satellite. The receive frequency band is separated by a frequency guard band from the transmit frequency band, and the filters together with isolation structure a physical separation between the transmit and receive signal paths provides sufficient isolation to reduce coupling between the transmit signal path and the receive signal path to allow the satellite antenna to operate in full-duplex.

Isolation structures refer to the embodiments within the antenna module that improve coupling isolation.

Additionally, it is to be noted that the frequency guard band, which in some embodiments is referred to as a guard bandwidth, is the frequency gap between the Tx frequency band and the Rx frequency band. In another embodiment, an antenna system includes M Tx/Rx user terminal elements (UTEs), each being application-agnostic and including a Tx/Rx antenna to generate an incoming signal in response to incident satellite radio waves and to simultaneously transmit an outgoing signal. Each Tx/Rx UTE includes an active circuit to process the incoming and outgoing signals, and a control circuit to control the processing performed by the M active circuits. The antenna system further includes N user terminal modules (UTM) each including a daisy-chain of O of the M active circuits, each UTM further including a buffer placed after every P active circuits in order to correct any degradation that has occurred in the daisy-chain, and wherein M can be adjusted so that an antenna area and a corresponding throughput and bandwidth available to an application are adjustable and scalable. Furthermore, the application-agnostic Tx/Rx UTEs can be manufactured in large volume and relatively low cost because the same Tx-Rx UTE can be used in multiple different applications. Some alternate, inferior means of isolation have been attempted, but do not enjoy the benefits of the described invention. For example, in some alternate approaches, full-duplex phased-array systems contain separate Tx and Rx panels, which are separated until isolation is sufficient. But such approaches are not tenable insofar as they require a great deal of spacing between the panels and would not provide a small-aperture antenna such as is provided by disclosed embodiments. Such alternate approaches in contrast to embodiments disclosed herein, fail to support applications that require high data rates with a small surface area. In some other inferior approaches. extra isolation between the transmit signal path and receive signal path is gained by using different, specific polarizations for the Tx and Rx beams. In contrast, disclosed embodiments call for a system with any polarization—even one that can change polarizations to meet changing requirements.

In operation, disclosed embodiments are capable of performing in full duplex mode despite the coupling of the Tx signal path onto the Rx signal path because the following Equation 1, below, is met, as seen by the Low Noise Amplifier (LNA) Input 438 (FIG. 4A):

$$P_{out} - I_{total} <= \text{Noise Floor at } f_{critical}. \quad \text{Equation 1}$$

Where $P_{out}$ is the power level at frequency $f_{critical}$ that is transmitted out of the system to a satellite.

$I_{total}$ is the total isolation at $f_{critical}$.

Noise Floor is the noise floor of a low-noise amplifier, and $f_{critical}$ is the highest frequency in the Rx band, where Tx power coupling is likely to be the highest.

The application of Equation 1 is further illustrated and described below.

As will be further described below, a full-duplex antenna system according to disclosed embodiments includes a transmit signal path that uses a power amplifier to drive a transmit antenna patch, and a receive signal path to receive a signal from a receive antenna patch into a low noise amplifier. The transmit and receive signal paths operate simultaneously at respective transmit and receive frequency bands, separated by a guard band. As will be described below, disclosed embodiments include one or more of the filters listed in Table 1. Listed in Table 1 are eight possible filters, one or more of which are to be included in the disclosed full-duplex antenna system. Table 1 also describes one or more advantages for each of the filters. In operation, one or more, or even all of the listed filters can be used to increase isolation between the transmit signal path and the receive signal path.

TABLE 1

Possible Filters to Include

| Filter No/ and Location | Advantages |
|---|---|
| 1. After a modem and before power amplifier (PA), and Tx antenna | Inexpensive because one is needed per system/module, not per element. Improves isolation across the entire system Can be used in series to increase isolation We can afford the loss on Tx filters, because we have PA power to spare (or we can add another amplifier at the beginning) |
| 2. Between PA and Tx antenna | Effectively Free (cost is the same as PCB cost) Filters out Tx frequencies near $f_{critical}$ Filters out Rx frequencies as soon as possible Improves isolation for many coupling channels |
| 3. After PA and Second Filter | Filters out Rx frequencies, even those generated by PA |
| 4. Embedded in Antenna Element | Filters out Tx frequencies near $f_{critical}$ Effectively Free (cost is the same as PCB cost) |
| 5. Embedded in Antenna Element | Effectively Free (cost is the same as PCB cost) Reduces Tx band interference, preventing LNA saturation |
| 6. Between the Rx antenna and the low noise amplifier (LNA) | Reduces Tx band interference Preventing LNA saturation, as on Filter 5 |
| 7. Between the sixth filter and the low noise amplifier | Effectively Free (cost is the same as PCB cost) Reduces Tx band interference |
| 8. After the low noise amplifier and before a modem | Filters out Tx frequencies before the modem |

Filter 1 through Filter 8 can be implemented using any filtering technology that is appropriate for their function in terms of power handling and band guard requirements. To list some examples of filter technologies that may be used: waveguide filters, coaxial filters, dielectric filters, and embedded filters in PCB. Embedded filters in PCB examples include but not limited to: stripline and microstrip filters, and Surface Acoustic Wave (SAW) filters. In addition, any of these filters may be a tunable filter, in which the resonance frequency and guard band can be controlled via signal processing. Furthermore, filters may be implemented as a low pass filter, high pass filter, band pass filter, band stop filter, or notch filter.

Advantageously, the filters together with the isolation structures provide sufficient total isolation between the transmit signal path and the receive signal path to reduce coupling, allowing the full-duplex antenna system to operate in full duplex.

FIG. 1 depicts a block diagram illustrating a general overview and architecture of a satellite communication system 100. As shown, the satellite communication system 100 includes a satellite 110 that uses satcom panel 112 to communicate with satcom panel 116 of modular gateway antenna system 115, which communicates with infrastructure 120, and, in turn, internet 125. Satellite 110 further uses satcom panel 114 to communicate with satcom panel (UTP) 132 of modular satellite user terminal antenna system 130 and UTP 172 of modular satellite user terminal antenna systems 170. Various additional satellite communications equipment is included and connected as shown to communicate with satellite 110. Such additional equipment includes UTMs 134, 142, 152, AND 157, modular wireless antenna systems 140, 150 and 160, and user equipment 135, 145, 155, 165, and 175. User equipment 145 uses UTE 144.

Figure 2A:
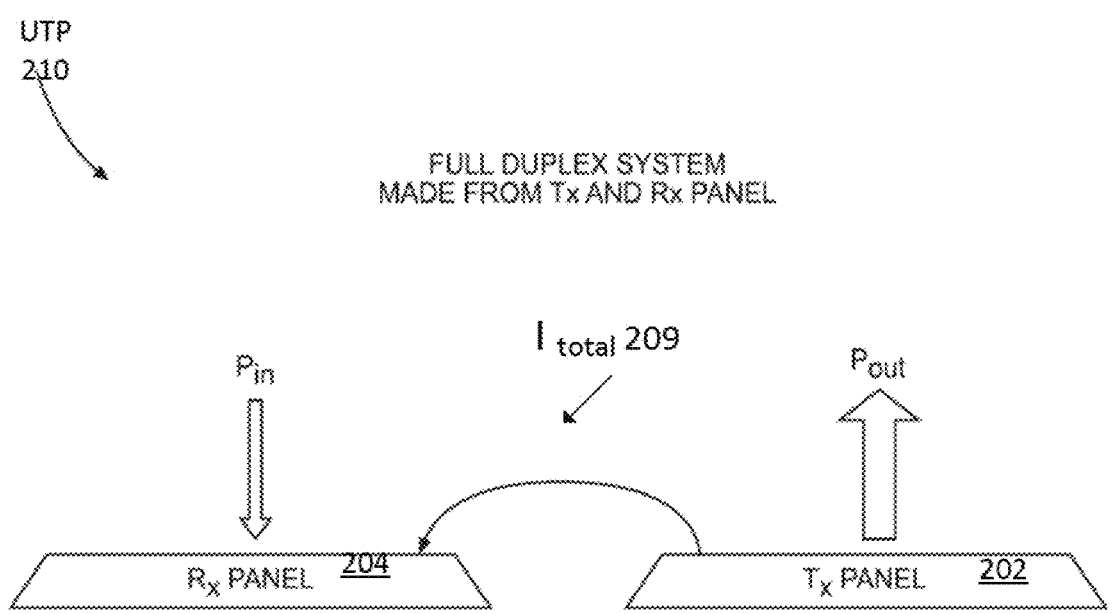
FIG. 2A illustrates an antenna system performing full-duplex communication using two half-duplex panels, according to some embodiments.

FIG. 2A illustrates an antenna system for performing full-duplex communication, according to some embodiments. As shown, UTP 210 includes Tx panel 202 and Rx panel 204, which include a total isolation, $I_{total}$ 209, owed solely due to the distance between them.

Figure 2B:
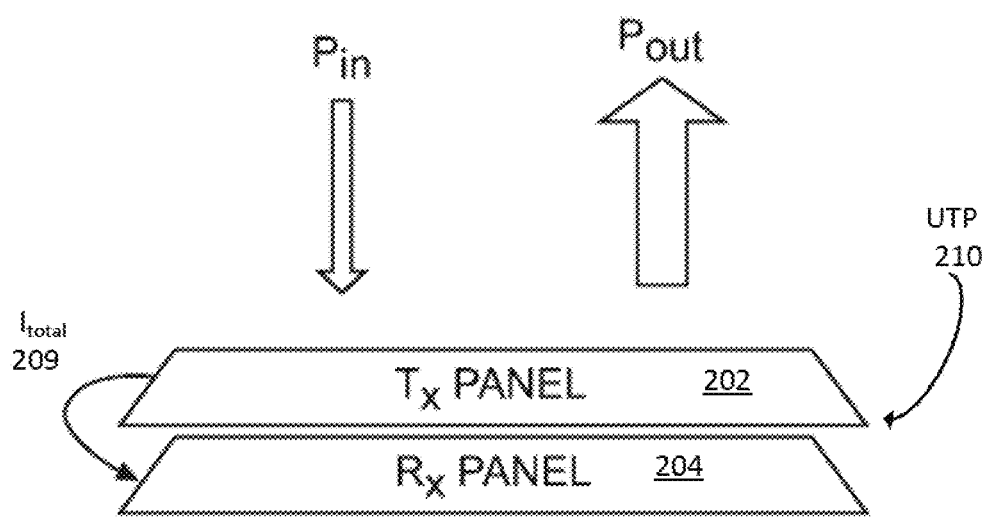
FIG. 2B illustrates a single antenna system for use in full-duplex communication, according to some embodiments.

FIG. 2B illustrates a Tx-Rx antenna panel for use in full-duplex communication, according to some embodiments. As shown, UTP 210 includes Tx panel 202 disposed above Rx panel 204. Also shown is a total isolation, Itotal 209 between the Tx panel and the Rx panel. $I_{total}$ 209 cannot be owed to the distance between them, because the panels are so close to each other.

Figure 2C:
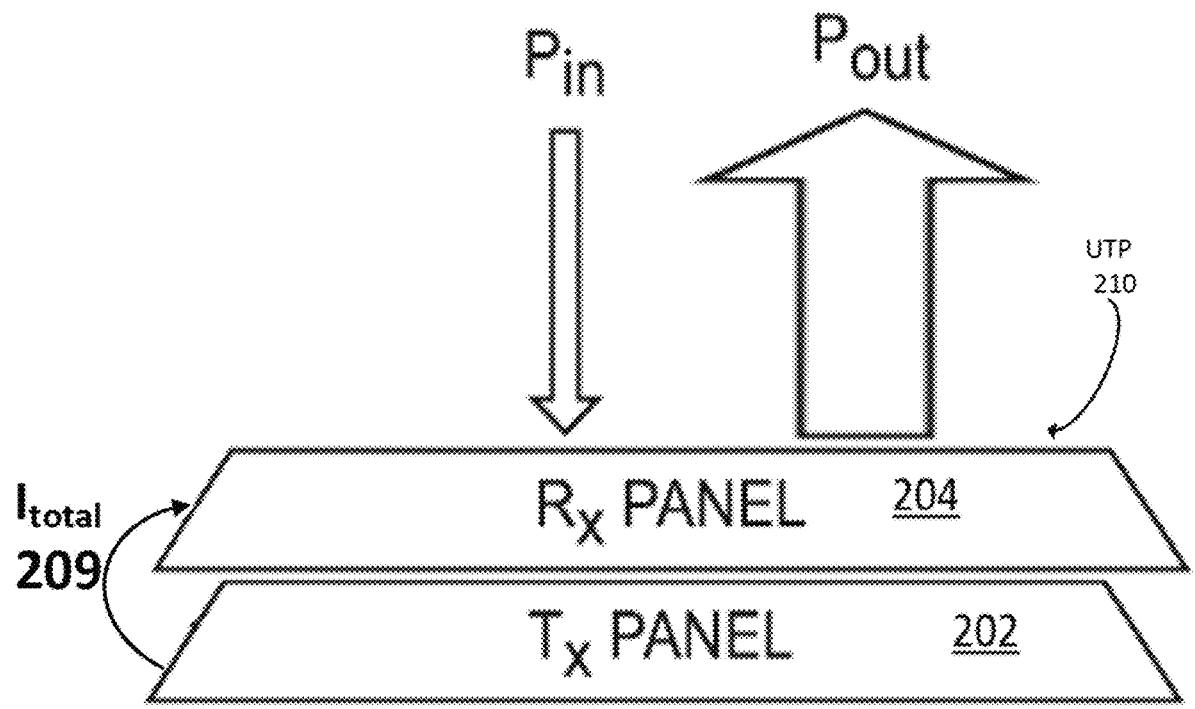
FIG. 2C illustrates a single antenna system for use in full-duplex communication, according to some embodiments.

FIG. 2C illustrates a Tx-Rx antenna system for use in full-duplex communication, according to some embodiments. As shown, UTP 210 includes Tx panel 202 disposed beneath Rx panel 204. Also shown is a total isolation, Itotal 209 between the Tx panel and the Rx panel. $I_{total}$ 209 cannot be owed to the distance between them, because the panels are so close to each other.

Figure 3A:
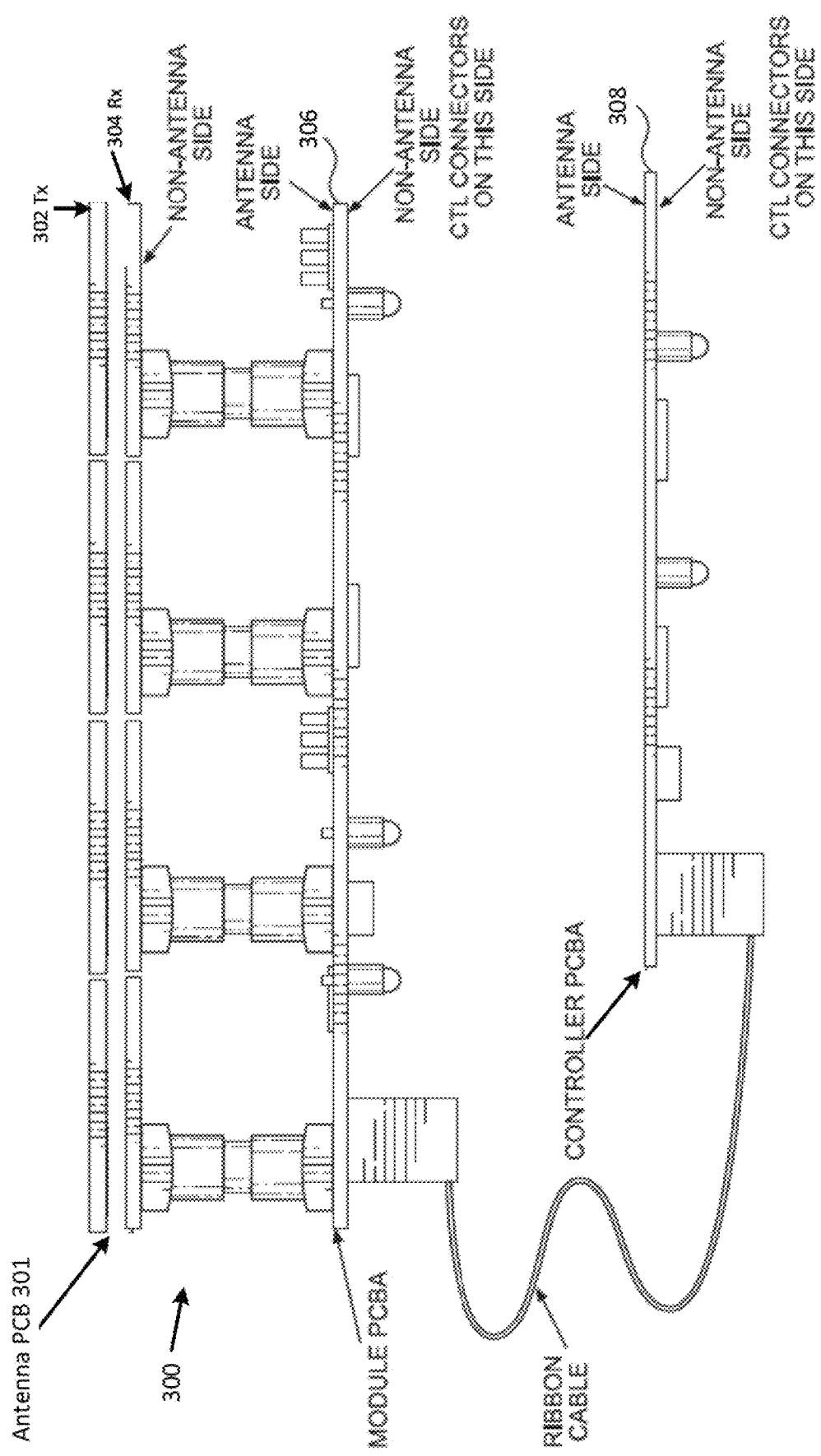
FIG. 3A depicts cross-sectional views of several antenna boards mounted onto a module board that is connected to a controller board, for use in a beam-scanning antenna system, according to some implementations.

FIG. 3A depicts cross-sectional views of an antenna board mounted onto a module board that is connected to a controller board, for use in a beam-scanning antenna, according to some implementations. As shown, module assembly 300 includes antenna PCB 301, which includes Tx layer 302 over Rx layer 304. UT antenna structures are etched on Tx layer 302 and Rx layer 304.

Module assembly 300 also includes module PCB 306, on which active circuit elements are placed. Also shown is controller PCB 308 which connects to the module ports using ribbon cables.

Figure 3B:
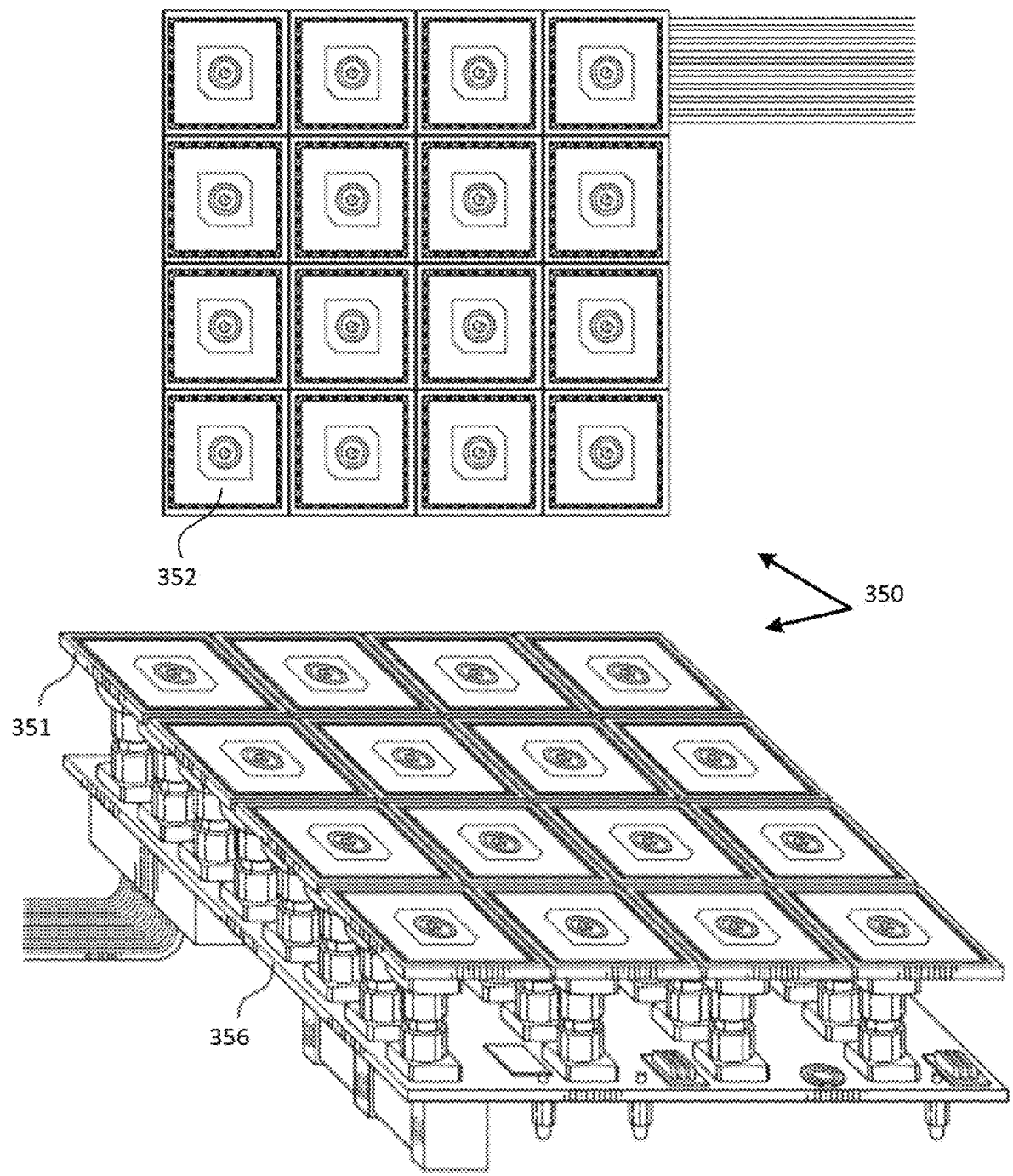
FIG. 3B depicts plan and perspective views of several antenna boards mounted onto a module board for use in a beam-scanning antenna, according to some implementations.

FIG. 3B depicts plan and perspective views of 16 antenna boards mounted onto a module board for use in a beam-scanning antenna system, according to some implementations. Module assembly 350 is shown in both plan view, in which multiple antenna elements 352 are visible, and in perspective view, in which both antenna PCB 351 and module PCB 356 are visible. In some embodiments, as here, antenna PCB 351 is a multi-layer board and includes a Tx antenna patch over an Rx antenna patch, as is illustrated with respect to FIG. 3A. The patches can be separated by one or more other layers, increasing the total isolation, $I_{total}$, between them. In some embodiments, the Tx and Rx antenna patches consist of separate PCBs, while in other embodiments, they are collocated on different layers of the same PCB.

Figure 4A:
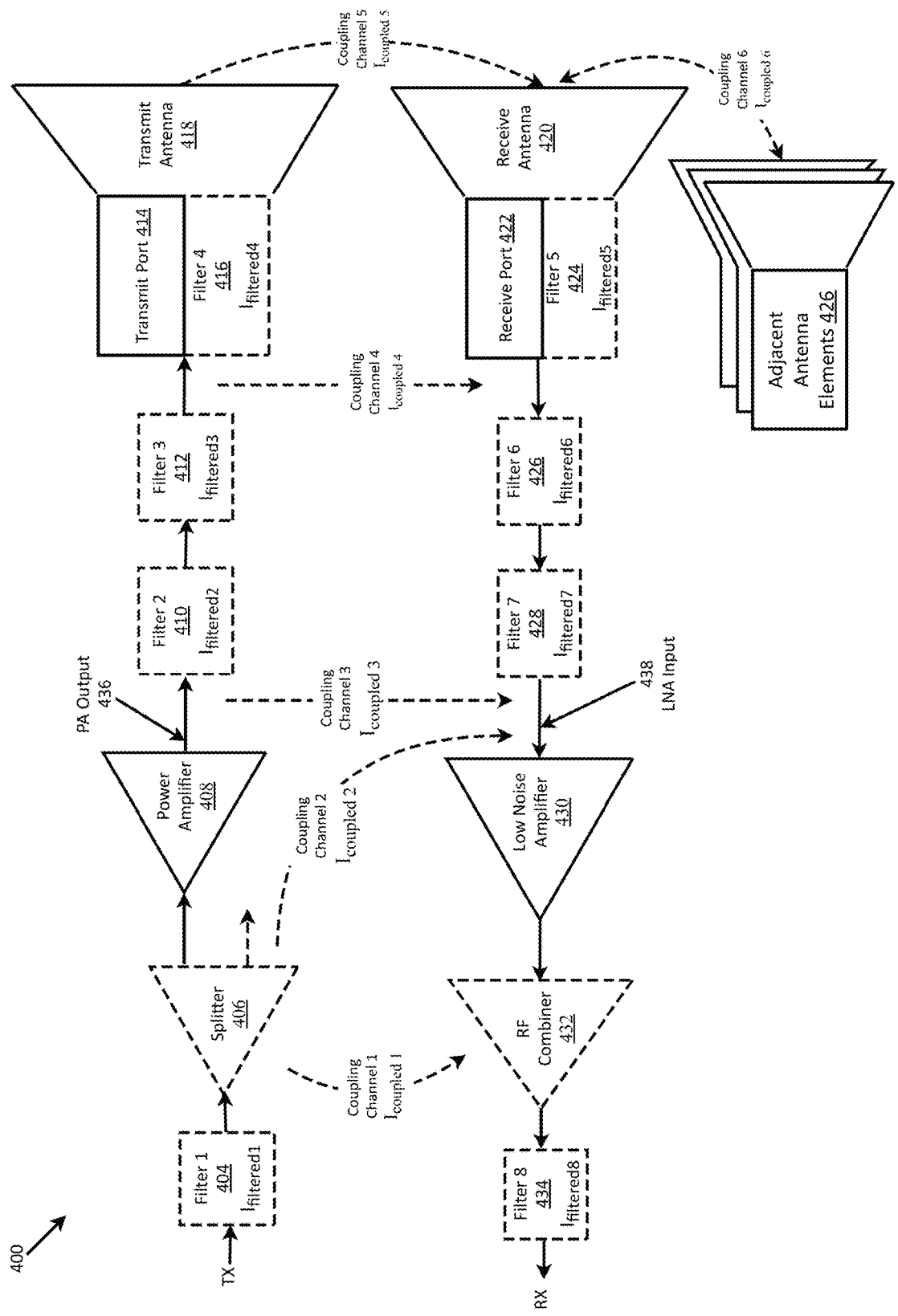
FIG. 4A is a block diagram view of an antenna system for use in full-duplex communication, according to some embodiments.

FIG. 4A is a block diagram illustrating the Tx and Rx signal chains leading to an antenna element for use in full-duplex communication, according to some embodiments.

Transmit/Receive Signal Paths: As shown, antenna element block diagram 400 includes a transmit signal path, which includes, connected in order, a Tx port (to receive an analog input from a modem of a user device), Filter 1 404, splitter 406 (the splitter is also referred to herein as a Tx distribution network), power amplifier 408, Filter 2 410, Filter 3 412, Filter 4 416, connected via transmit port 414 to transmit antenna patch 418. Also shown is a receive signal path which includes, connected, in order, receive antenna patch 420, connected via port 422 to Filter 5 424, which drives Filter 6 426, which drives Filter 7 428, which drives low noise amplifier 430, which drives RF combiner (the combiner is also referred to herein as a Rx distribution network) 432, which drives Filter 8 434, which drives an Rx port (to provide as an analog output to the modem of the user device). Also marked are 436, Pout at the output of PA 408, and 438, Pin at the input of 430 LNA input.

In some embodiments, the one or more RF splitters in the transmit signal path is also referred to as a distribution network or a corporate network. In other embodiments, the one or more RF combiners in the receive signal path is also referred to as a distribution network or a corporate network.

Coupling Channels

FIG. 4A shows six different coupling channels, between two circuit locations, where significant coupling can occur. Table 2 describes the six routing channels shown in FIG. 4A, and describes strategies instilled by disclosed embodiments to address or minimize the coupling during full-duplex operation.

TABLE 2

| Coupling Channels | |
|---|---|
| Coupling Channel | Description |
| $I_{coupled1}$: Distribution Network Trace Coupling | Coupling from Tx distribution network to Rx distribution network |
| $I_{coupled2}$: Transmit traces to Rx Elements | Coupling from Tx distribution network to the input of the LNA 438 of the Rx chip |
| $I_{coupled3}$: Element Chip to Element Chip coupling | Coupling from Tx chip PA 436 to the input of the LNA 438 of the Rx chip |
| $I_{coupled4}$: Antenna Feed Coupling | Coupling from the Tx antenna feed to the Rx antenna feed, usually when vias and feed lines are run nearby each other |
| $I_{coupled5}$: Free space + PCB coupling | Coupling from the Tx patch of an element to the Rx patch of the same element |
| $I_{coupled6}$ Free Space coupling | Coupling from the Tx patch of one element to the Rx patch of another element |

Filter Placements: FIG. 4A shows five different coupling opportunities between the Tx signal path and the Rx signal path, and a coupling opportunity to adjacent antenna elements' Tx signal paths. Selecting types of filtering structures and locations of filters is part of implementing a full-duplex communication. It should be noted that filter locations matter: where a filter is placed may impact the effectiveness of the isolation. For example, Filter 2 410 is placed after the power amplifier 408, so it improves $I_{coupled4}$, $I_{coupled5}$, and $I_{coupled6}$.

Filter Designs: Table 3 lists the eight filters illustrated in FIG. 4A, which were also listed in Table 1, and describes the type of each filter, be it a band-pass filter (BPF) or a notch filter. Table 2 also indicates the filter's contribution to $I_{total}$.

Filter Selections: Each of the filters in FIG. 4A are illustrated with dashed borders, indicating that they are optional. Some antenna embodiments contain all eight filters, while other embodiments contain as few as one filter.

TABLE 3

| Filter Designs | | |
|---|---|---|
| Filter | Type | Contribution to $I_{total}$ |
| 1 | BPF | $I_{filter1}$ >30 dB assuming 1 GHz guard band |
| 2 | Notch | $I_{filter2}$~20 dB |
| 3 | BPF | $I_{filter3}$ >30 dB assuming 1 GHz guard band |
| 4 | Notch | $I_{filter4}$~20 dB |
| 5 | Notch | None |
| 6 | BPF | None |
| 7 | Notch | None |
| 8 | BPF | None |

Definitions

As used herein, several terms are used to describe disclosed embodiments, and a few of those terms are defined as follows:

$P_{out}$ is the power level (at frequency $f_{critical}$) that is transmitted out of the system, to a satellite.

$P_{in}$ is the power level of the intended receive signal coming from the satellite, which is assumed to be above the noise floor.

$f_{critical}$ is the highest frequency in the Rx band, where the Tx power is likely to be the highest in the band, which creates a likelihood of violating the critical calculation above.

Skirt is the difference in dB between $P_{out}$ in the Tx frequency band, and $P_{out}$ at $f_{critical}$. The Skirt is determined by the Tx instantaneous bandwidth, frequency division multiplexing scheme, and modulation scheme. In this analysis, it is considered a fixed constant in the range of 40 dB.

Noise Floor is the noise floor of the low-noise amplifier.

$I_{total}$ is the total effective isolation from system input to system output at $f_{critical}$.

Throughout the analysis, Isolations values (including terms like $I_{total}$, $I_{effective2}$, and $I_{filtered4}$) are written as positive numbers. However, the same values would be measured as negative S Parameters on a Spectrum or Network analyzer—similar to the relationship between S11 and Return Loss.

$I_{total}$ is approximately equal to the coupling channel with the least effective isolation $I_{effective}$. Therefore, it is important to improve all $I_{effective\#s}$ until their value is higher than the goal value for $I_{total}$.

$I_{effective1} = I_{filtered1} + I_{coupled1}$ $I_{effective2} = I_{filtered1} + I_{coupled2}$ $I_{effective3} = I_{coupled3}$ (this can be reduced with shielding, if necessary)

$I_{effective4} = I_{filtered2} + I_{filtered3} + I_{coupled4}$ $I_{effective5} = I_{filtered2} + I_{filtered3} + I_{filtered4} + I_{coupled5}$ $I_{effective6} = I_{filtered2} + I_{filtered3} + I_{filtered4} + I_{coupled6}$ Advantages of Disclosed Filters The disclosed full-duplex antenna system, isolated with one or more of the eight filters listed in Tables 1 and 3 provides several advantages over the alternate, inferior approaches discussed above.

First, the disclosed full-duplex antenna system may be useful in applications that need a high data rate, but with limited antenna surface area. For example, the disclosed full-duplex antenna system may be used in a small device, such as a hand-held device requiring high data traffic (e.g., for Internet browsing or real-time streaming), but with limited antenna size. Alternate, inferior solutions that address self-interference simply by increasing a distance between a half-duplex receive patch antenna and a half-duplex transmit patch antenna would not work when such a small aperture is required.

Second, the disclosed full-duplex antenna system has an advantage of not requiring the antenna elements to have a fixed polarization to improve isolation between them. The disclosed full-duplex antenna system can work with any polarization and can even dynamically adjust the polarizations if needed.

Figure 4B:
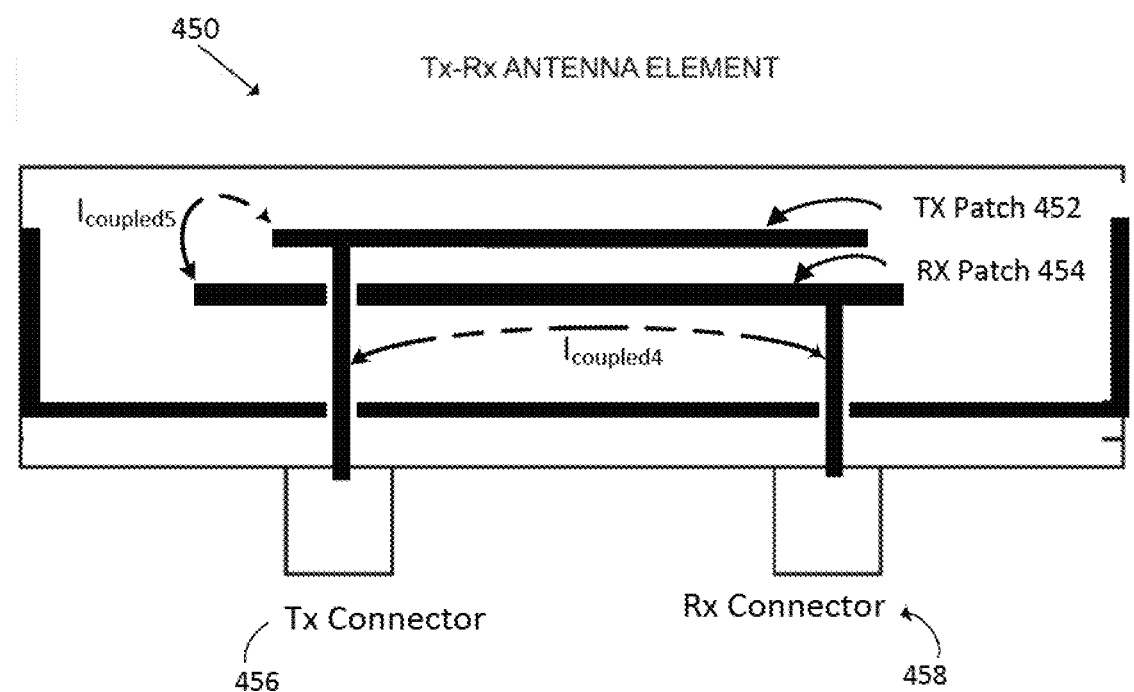
FIG. 4B is a cross-sectional view of an antenna element for use in full-duplex communication, according to some embodiments.

FIG. 4B is a cross-sectional view of an antenna element for use in full-duplex communication, according to some embodiments. As shown, UTE 450, which is an antenna element, includes Tx patch 452 disposed above and with a slight separation from Rx patch 454. Rx and Tx antennas are sometimes referred to as apertures. Also shown are Icoupled4, the coupling between the Tx feedline and the Rx feedline, and Icoupled5, the coupling between Tx patch 452 and Rx patch 454. Tx patch 452 is connected to Tx connector 456. Likewise, Rx patch 454 is connected to Rx connector 458. Also marked are 436, Pout at the output of PA 408, and 438, Pin at the input of 430LNA input.

Figure 4C:
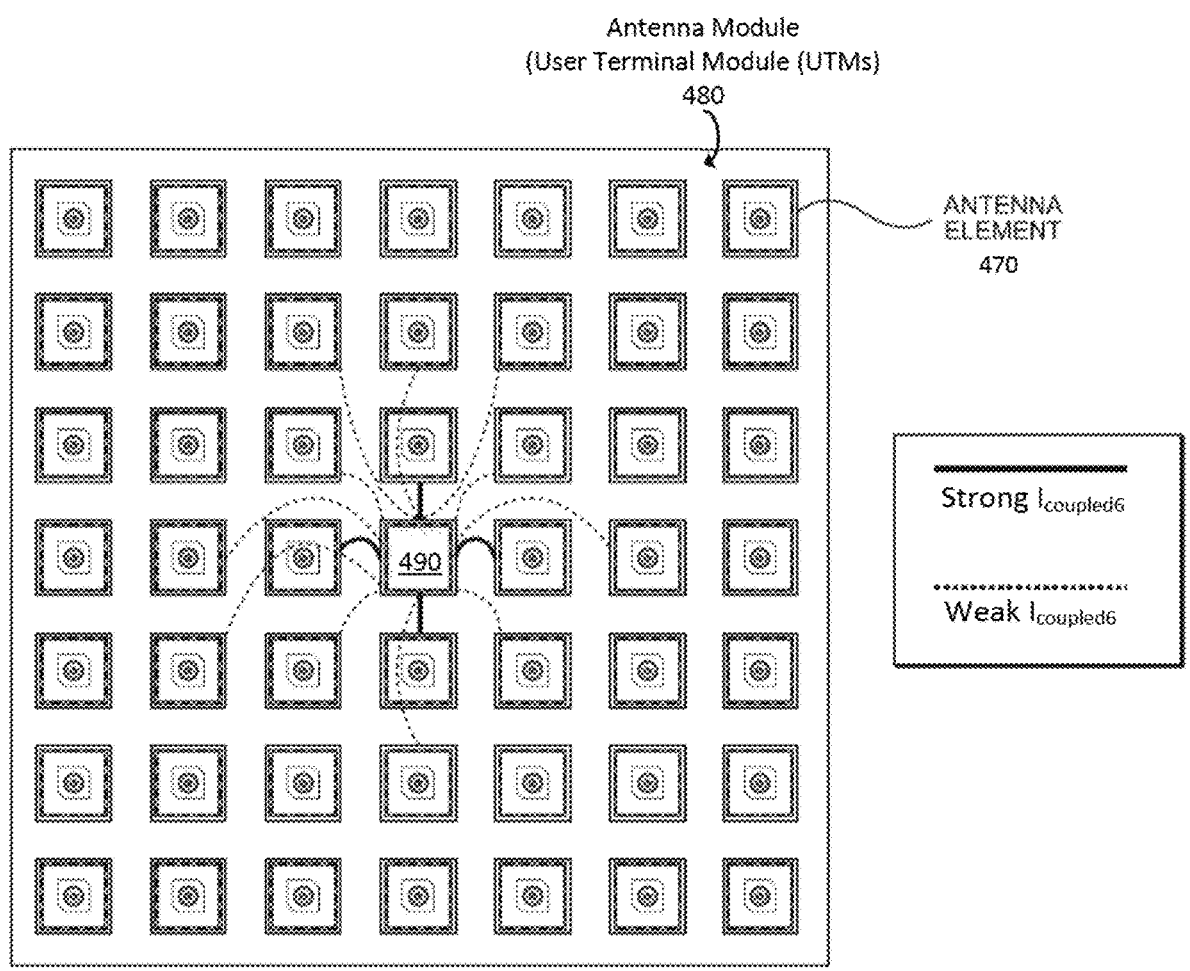
FIG. 4C illustrates an antenna module including multiple antenna elements performing full-duplex communications according to some embodiments.

FIG. 4C illustrates an antenna module including multiple antenna elements performing full-duplex communications according to some embodiments. As shown, antenna module 480 (user terminal module, or UTM) includes an array of antenna elements 470 (UTEs). Here, antenna element 470 (UTE) is an antenna element and includes a Tx antenna aperture situated over an Rx antenna aperture. Viewed from the top, however, only the Tx antenna aperture is visible. One of the antenna elements, UTE 490 is shown having strong coupling to nearby UTEs, and weak coupling to more distant UTEs.

In other embodiments (not shown), the full-duplex antenna system includes a Rx antenna situated over a Tx antenna.

Figure 5A:
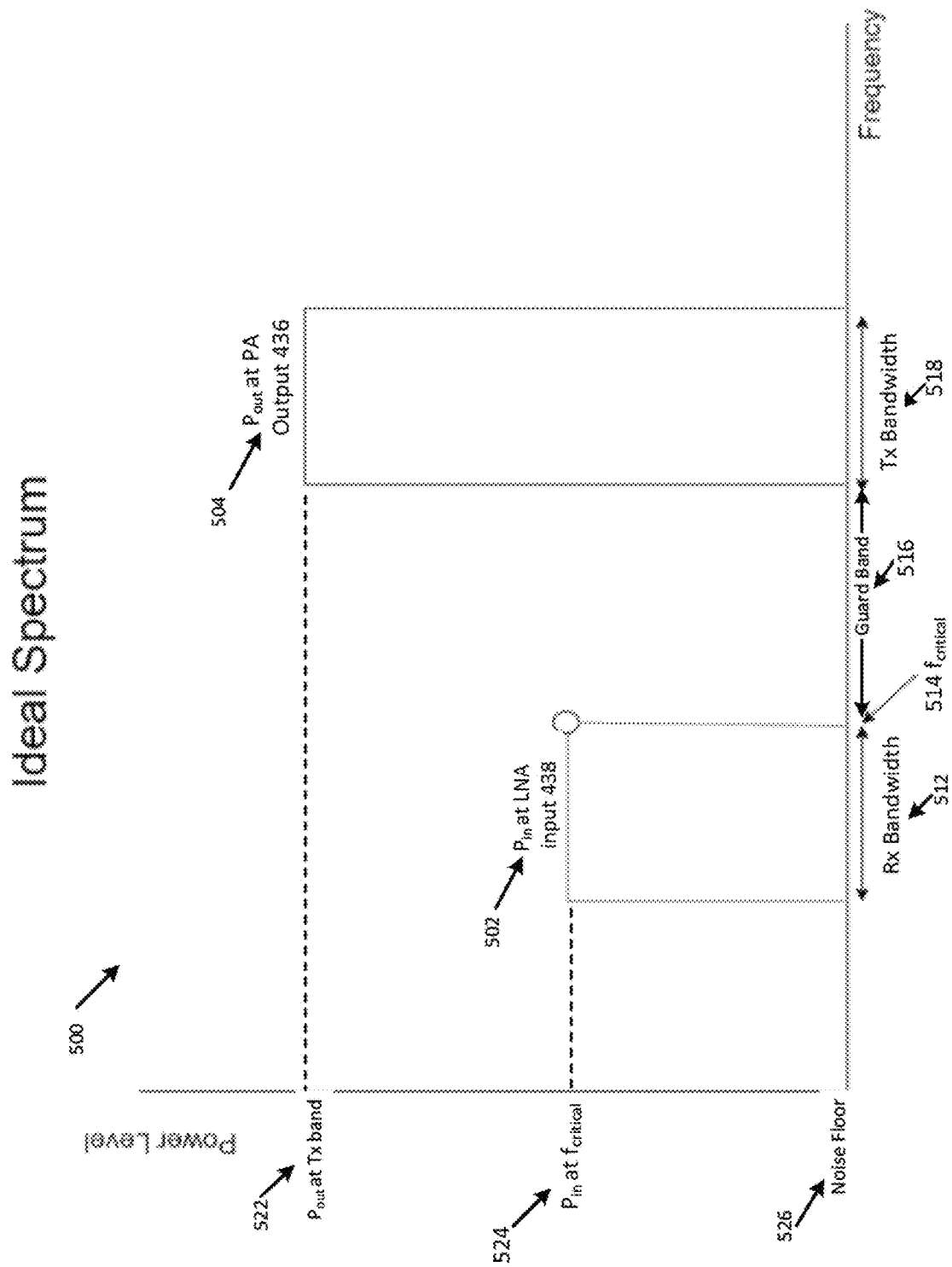
FIG. 5A is a graph illustrating an ideal spectrum of Tx power out and Rx power versus frequency, according to some embodiments.

FIG. 5A is a graph illustrating an ideal spectrum 500 of Tx power, Pout 504 and low-noise amplifier power input, Pin 502 versus frequency, according to some embodiments. As shown, graph 500 depicts the power spectrum of the Rx signal at the input of the LNA 438 (FIG. 4A). Graph 500 depicts the power spectrum of the Tx signal at the output of the PA 436 (FIG. 4A).

By design, the highest level of $P_{in}$, 524, occurs over Rx bandwidth 512 showing Pin at LNA input 438 (FIG. 4A). The highest level of $P_{out}$, 522, occurs over Tx bandwidth 518 showing Pout at the output of the PA 436 (FIG. 4A). Tx bandwidth 518 is separated from Rx bandwidth 512 by guard band 516. As can be seen, this being an ideal situation, there is zero Tx power $P_{out}$ at $f_{critical}$ 514, and the power, being zero, is lower than noise floor 526.

Figure 5B:
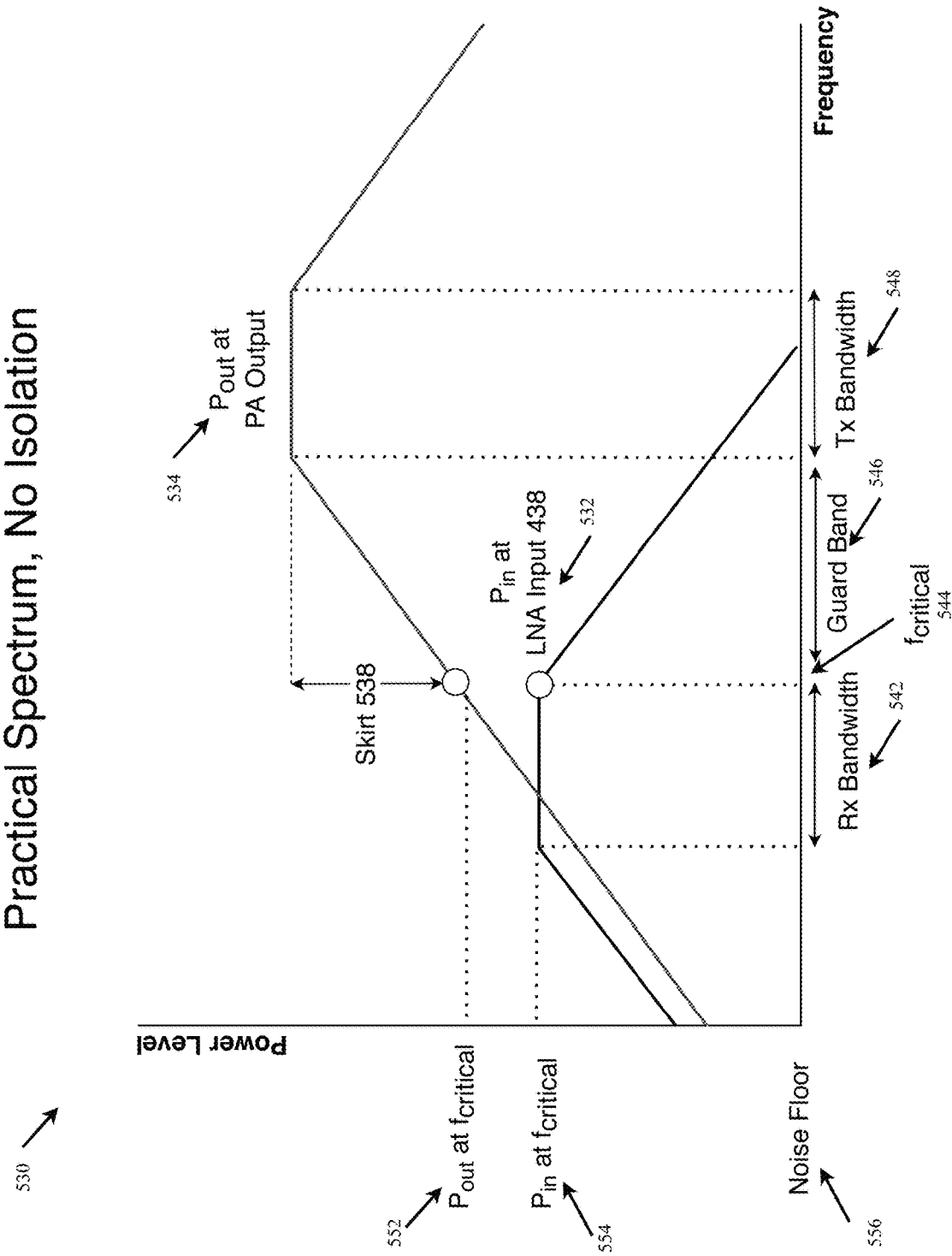
FIG. 5B is a graph illustrating a practical spectrum of Tx power out and Rx power versus frequency, according to some embodiments.

FIG. 5B is a graph illustrating a practical spectrum 530 of the Tx signal power and the Rx signal power. As shown, graph 532 depicts the Rx signal at the input of the LNA 438 (FIG. 4A) and graph 534 depicts the Tx signal at the output of the LNA 438 (FIG. 4A). By design, the highest level of $P_{in}$ occurs over Rx bandwidth 542, and the highest level of $P_{out}$ occurs over Tx bandwidth 548, which is separated from Rx bandwidth 542 by guard band 546. $f_{critical}$ 544 is the frequency that poses the greatest risk of adverse interference on the Rx signal path from the Tx signal path. Also shown is skirt 538, which is the difference in dB between Pout in the Tx frequency band, and Pont at $f_{critical}$. The skirt is determined by the Tx instantaneous bandwidth, frequency division multiplexing scheme, modulation scheme, and output power. In this analysis, it is considered a fixed constant outside the control of the system. As can be seen, without the filtering and isolation techniques of disclosed embodiments, $P_{out}$ at $f_{critical}$ 552 is higher than $P_{in}$ at $f_{critical}$ 554. For reliable full full-duplex operation, the coupling of $P_{out}$ into the Tx signal path before the LNA at $f_{critical}$ needs to be lower than noise floor 556, which is achieved by isolation and filtering techniques of disclosed embodiments.

Figure 5C:
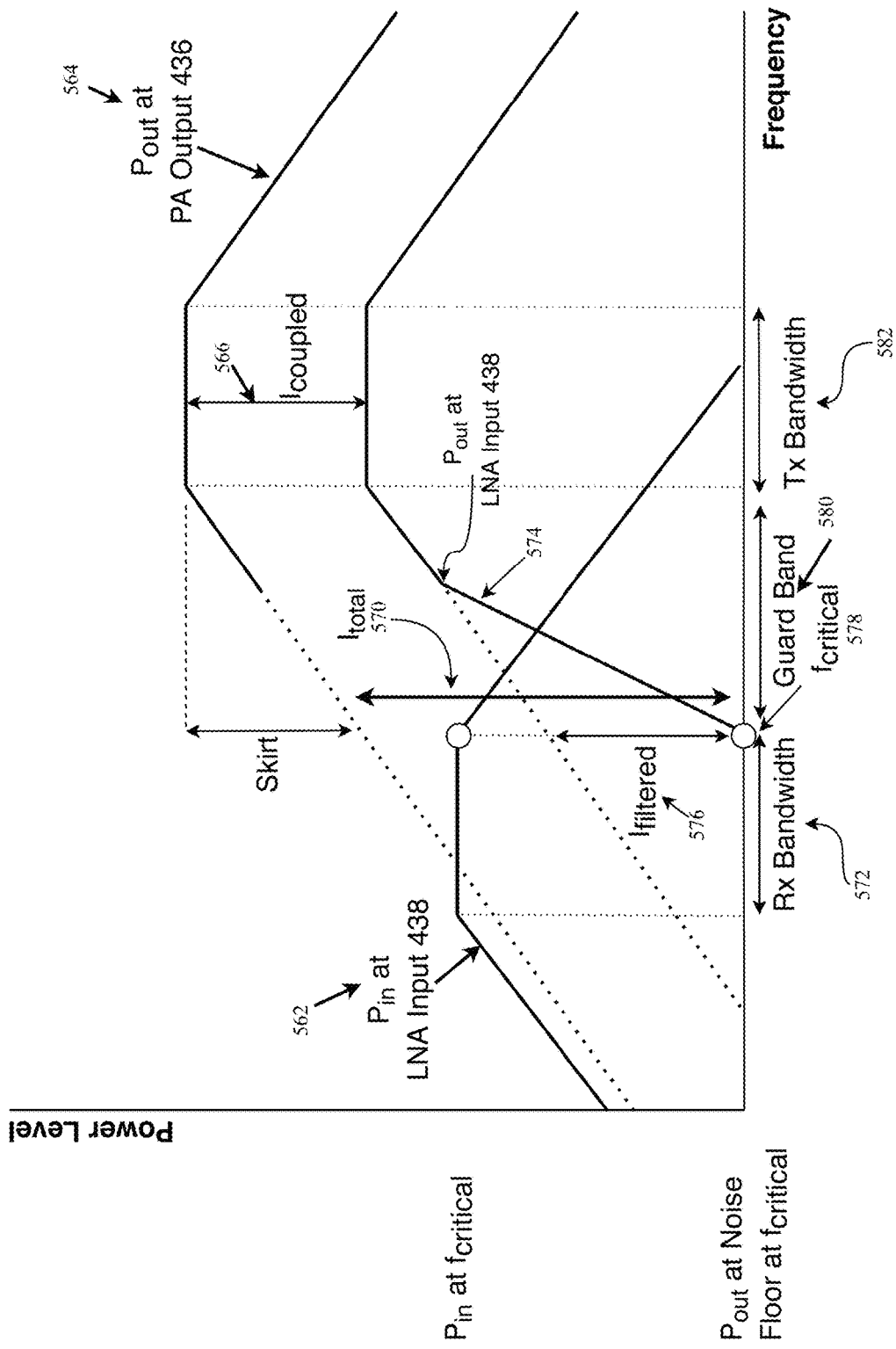
FIG. 5C is a graph illustrating a coupling of signal power from a transmit signal path onto a receive signal path, according to some embodiments.

FIG. 5C is a graph illustrating a practical spectrum 560 where the coupling of signal power from a transmit path to a receive signal path is illustrated, according to some embodiments. Within this figure, the Tx and Rx signal spectra are shown at two locations in the block diagram of FIG. 4A. In particular, graph 564 is the $P_{out}$ spectrum at the output of the PA 436 (FIG. 4A), and graph 574 is the $P_{out}$ spectrum that can be coupled into the Rx signal path to be measured at the input of the LNA 438 (FIG. 4A). Additionally, graph 562 is the $P_{in}$ spectrum at the input of the LNA 438 (FIG. 4A). Notice that the $P_{out}$ power primarily exists in the Tx bandwidth 582, and power outside of that band can be filtered out within the Tx signal chain without adverse effects on the Tx signal because the filter transition is allowed in the guard band 580, where no useful signal power is located. 562 is the power of the Rx signal that is received by the antenna and has power mostly located in the Rx Bandwidth 572. As can be seen, the total isolation 570 between the Tx signal path and the Rx signal path, made up of the sum of isolation due to filters 576 and the isolation due to isolation structures in coupling channels 566, reduces the Tx power Pout at the critical frequency $f_{critical}$ 578 to a power level that is lower than the power level of the noise floor. Advantageously, the Rx signal path can be used during full-duplex communication, without interference by coupling from the Tx signal path.

Figure 6A:
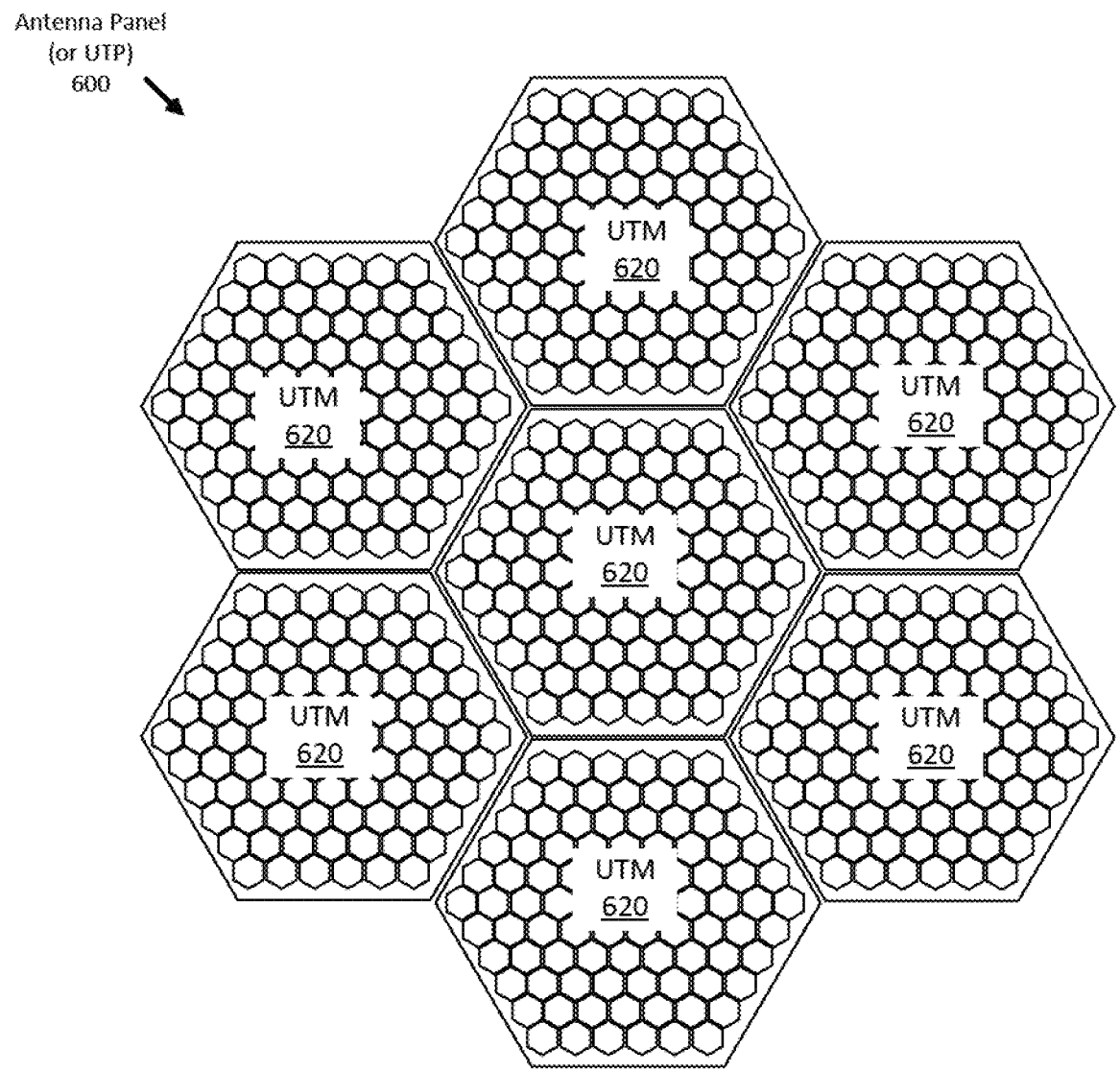
FIG. 6A depicts a block diagram illustrating an example modular architecture of an antenna panel with multiple antenna modules, according to some implementations.

FIG. 6A depicts a block diagram illustrating an example modular architecture of an antenna panel 600 (or user terminal panel) formed with multiple antenna modules, UTM 620, according to some implementations. As used herein antenna panel 600 is sometimes referred to as satellite antenna system or UTP (user terminal panel). More specifically, the example of FIG. 6A illustrates the antenna panel 600 (or user terminal panel) formed with multiple antenna modules, UTM 620. The antenna panel 600 (or user terminal panel) can be any one of the antenna panels shown and discussed with reference to FIG. 1 (e.g., satcom panels 112, 114, or 116), although alternative configurations are possible. Furthermore, although UTM 620 is primarily shown with a hexagonal form factor, it is appreciated that other form factors, e.g., triangular, square, rectangular, circular, etc., including combinations or variations thereof are also possible.

Figure 6B:
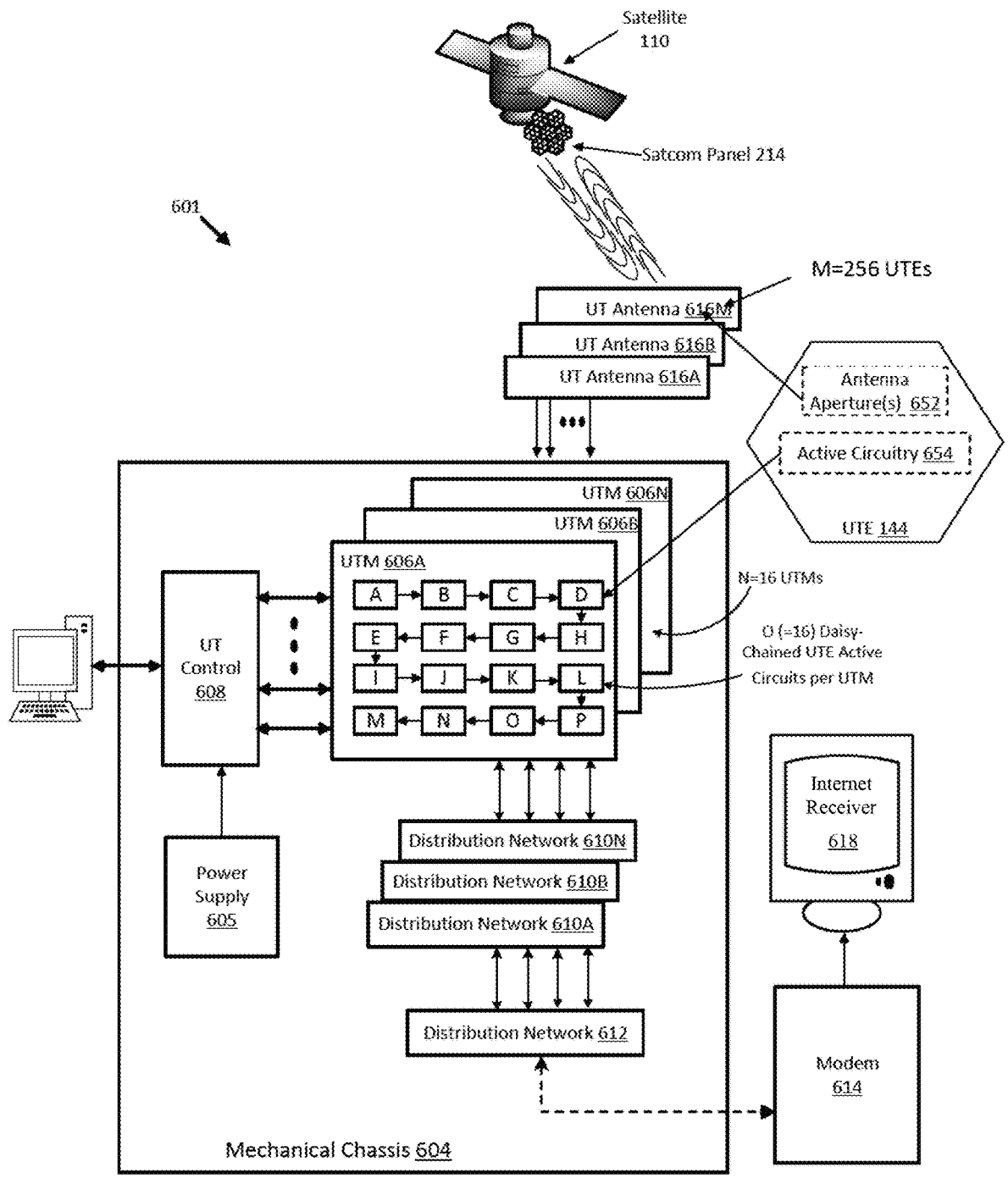
FIG. 6B depicts a block diagram illustrating an example system of a beam-scanning antenna system to transmit and receive satellite radio wave signals in full duplex, according to some implementations.

FIG. 6B depicts a block diagram illustrating an example system (beam-scanning antenna) to transmit and receive satellite radio wave signals in full duplex, according to some implementations. As shown, satellite antenna system 601 includes a mechanical chassis 604, which contains power supply 605 and multiple user terminal modules, UTM 606A, UTM 606B, up to UTM 606N, with N equal to 16. Each of the UTMs includes sixteen daisy-chained UTEs, which are each examples of UTE 144, and which each contain active circuitry 654 and antenna aperture(s) 652 (In some embodiments, the UTE contains both an Rx antenna aperture and a Tx antenna aperture.). In other embodiments, more than sixteen UTEs are daisy chained. The processing performed by the active circuits of the UTEs is controlled by UT control 608.

As shown, the sixteen UTMs provide sixteen analog signals to a first level of RF combiners. shown as distribution network 610A, distribution network 610B, up to distribution network 610N, with N equal to 4 since each combiner receives signals from four UTMs. A second combinatorial level, RF combiner 612, combines the signals from the first level. It should be noted that in other embodiments, there can be more or fewer combiners. It also should be noted that the number of levels of combiners can vary. In other words, while two levels of combiners are shown in FIG. 6B, in other embodiments, there can be more or fewer levels.

Also shown are UT antennas 616A, 616B, up to 616M. Here, M equals 256, N equals 16, and O, the number of UTEs per UTM, equals 16.

In operation, antenna panel 600 provides satellite communications for a personal computer application. In doing so, antenna panel 600 communicates with satellite 110, which is shown including a satcom panel 214.

In some embodiments, each of the M antennas of the M UTEs is tuned to one or more of a plurality of different frequency ranges. In some embodiments, each of the antennas on each of the UTM modules is identical. As shown, the incoming signal received from the antenna of each UTE is an analog voltage, and each of the M active circuits receives, processes, and produces an output signal having an analog voltage, and each of the N UTMs produce an analog signal that is combined with analog signals from other UTMs. Received radio wave signals are delivered from RF combiner 612 to modem (transceiver) 614 which provides them to device 618, such as a TV or an internet receiver.

Figure 7:
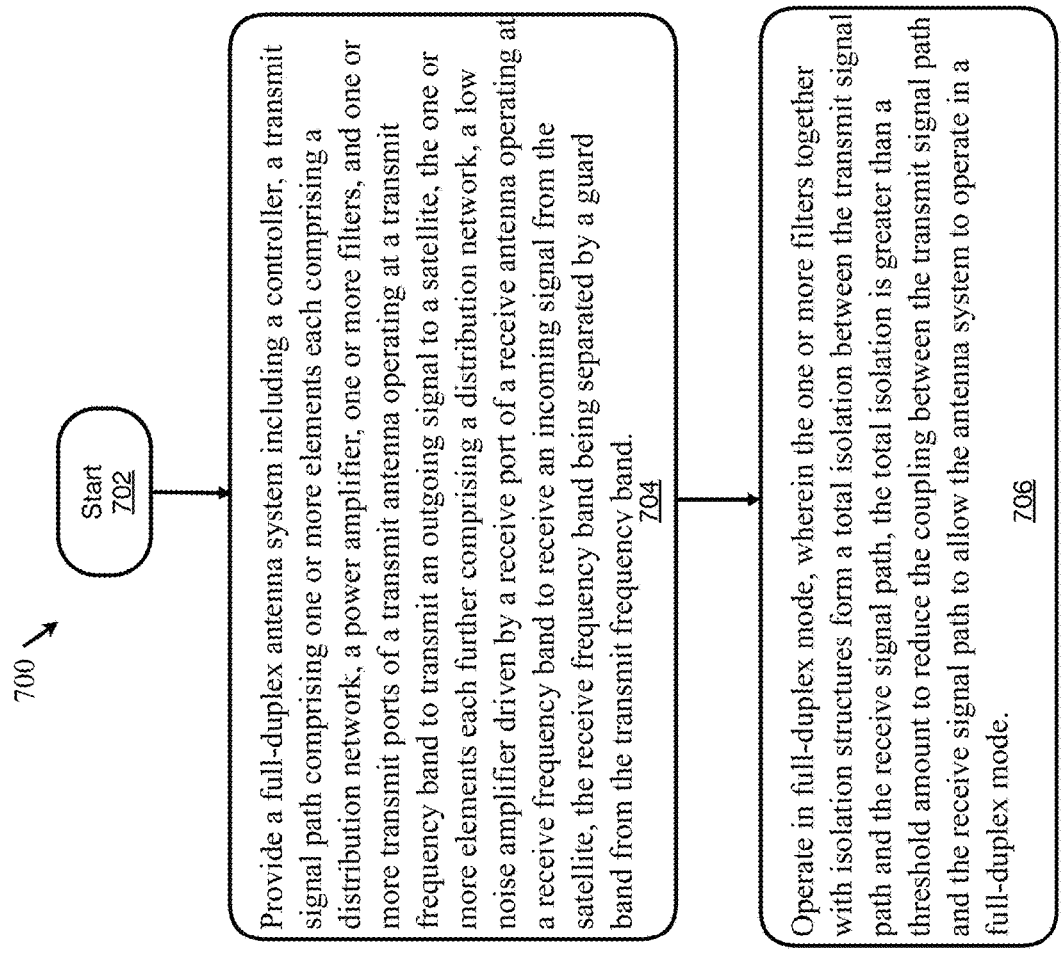
FIG. 7 illustrates a method of using a full-duplex antenna system to communicate with a satellite in full duplex mode, according to some embodiments.

FIG. 7 illustrates a method of using an antenna system array to communicate with a satellite in full duplex, according to some embodiments. As shown, flow 700 starts at 702. Operation 704 calls for providing a full-duplex antenna system including a controller, a transmit signal path comprising one or more elements each comprising a distribution network, a power amplifier, one or more filters, and one or more transmit ports of a transmit patch antenna operating at a transmit frequency band to transmit an outgoing signal to a satellite, the one or more elements each further comprising a distribution network, a low noise amplifier driven by a receive port of a receive patch antenna operating at a receive frequency band to receive an incoming signal from the satellite, the receive frequency band being separated by a guard band from the transmit frequency band. Then, operation 706 calls for operating in full-duplex mode, wherein the one or more filters together with isolation structures form an effective isolation between the transmit signal path and the receive signal path, the effective isolation is greater than a threshold amount to reduce the coupling between the transmit signal path and the receive signal path to allow the antenna system to operate in a full-duplex mode.

1. Maintaining Orthogonally Polarized Tx and Rx Beams

As used herein, active circuitry can also sometimes be called chips, RFICs, beamformers, and beamforming RFICs. Disclosed Tx Beamforming RFIC's have a Power Amplifier (PA) at the RF output pins, and Rx Beamforming RFIC's are assumed to have an LNA at the RF input pins.

Figure 8A:
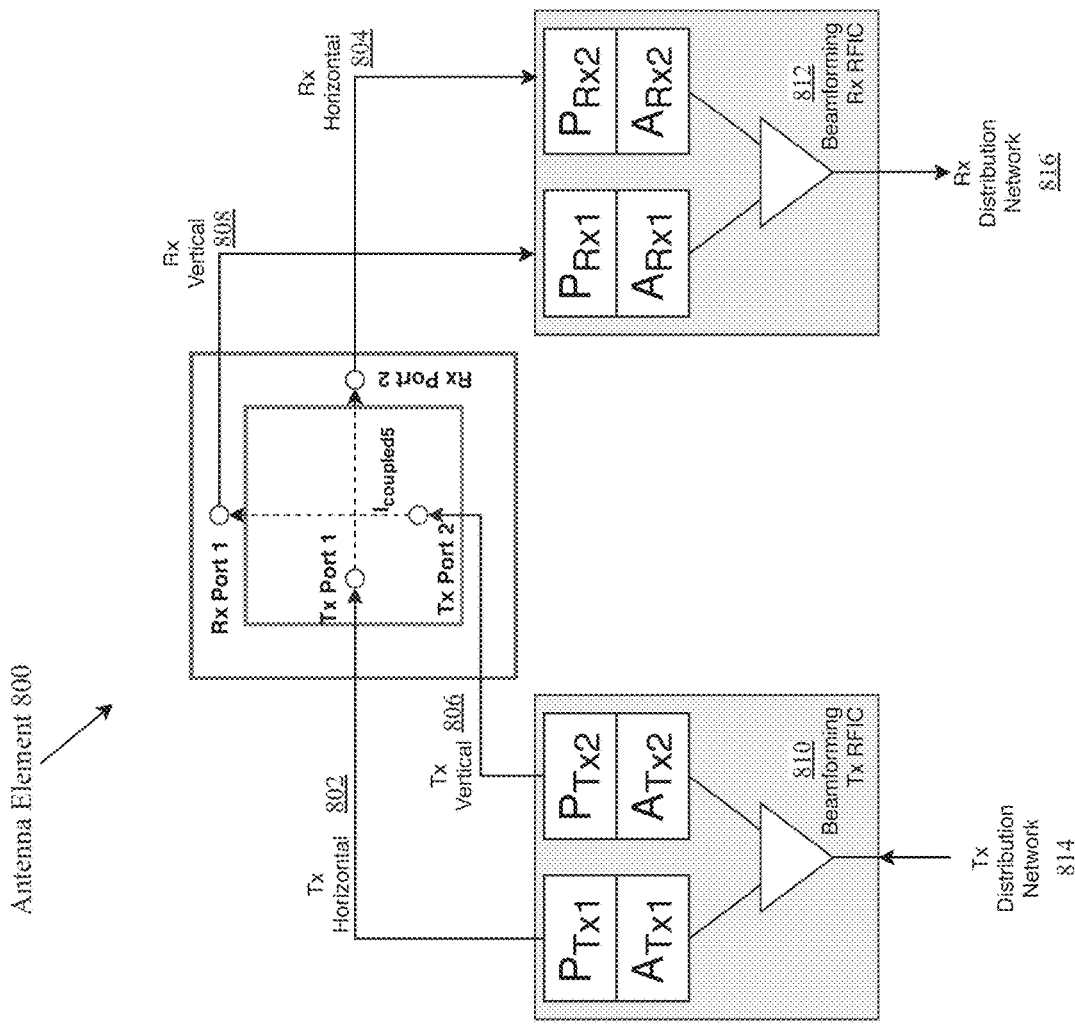
FIG. 8A illustrates a full-duplex antenna element according to some embodiments.

FIG. 8A illustrates a full-duplex antenna according to some embodiments. As shown, antenna 800 includes Tx horizontal feed 802, Rx horizontal feed 804, Tx vertical feed 806, Rx vertical feed 808, beamforming Tx RFIC 810 (Radio Frequency Integrated Circuit), beamforming Rx RFIC 812, Tx distribution network 814, and Rx distribution network 816. Here, beamforming Tx RFIC 810 and beamforming Rx RFIC 812 are connected to the four ports of an antenna. In this example, the Tx Patch and Rx Patch are collocated on different layers of the same PCB, enabling a single shared aperture.

Antenna 800 is a four-port antenna that is connected to two RFIC. Beamforming Tx RFIC 810 has a single input, an RF power splitter, and multiple outputs with phase controls $P_{Tx1}$ and $P_{Tx2}$ and amplitude controls $A_{Tx1}$ and $A_{Tx2}$, which act on their respective output. Beamforming Rx RFIC 812 has a single output, an RF power combiner, and multiple inputs with phase controls $P_{Rx1}$ and $P_{Rx2}$ and amplitude controls $A_{Rx1}$ and $A_{Rx2}$, which act on their respective output.

Furthermore, each antenna has two orthogonal linear ports, which allow independent control of horizontal and vertical polarizations of the Tx and Rx beams. In particular, the phases ($P_{Tx1}$, $P_{Tx2}$, $P_{Rx1}$, $P_{Rx2}$) and amplitudes ($A_{Tx1}$, $A_{Tx2}$, $A_{Rx1}$, $A_{Rx2}$) of the signals going through the four ports to enable full polarization agility, in which any circular and any linear polarized beam is possible.

In order to partially reduce the coupling between the Tx patch and the Rx patch, in other words to improve Icoupled5, the Tx and Rx beams must have orthogonal polarizations. For example, in FIG. 8A, if only Port 1 is excited by setting $A_{Tx1}$, $A_{Rx1}$ as high as possible and setting amplitudes $A_{Tx2}$, $A_{Rx2}$ as low as possible, the Tx beam will be horizontal, and the Rx beam will be vertical.

Figure 8B:
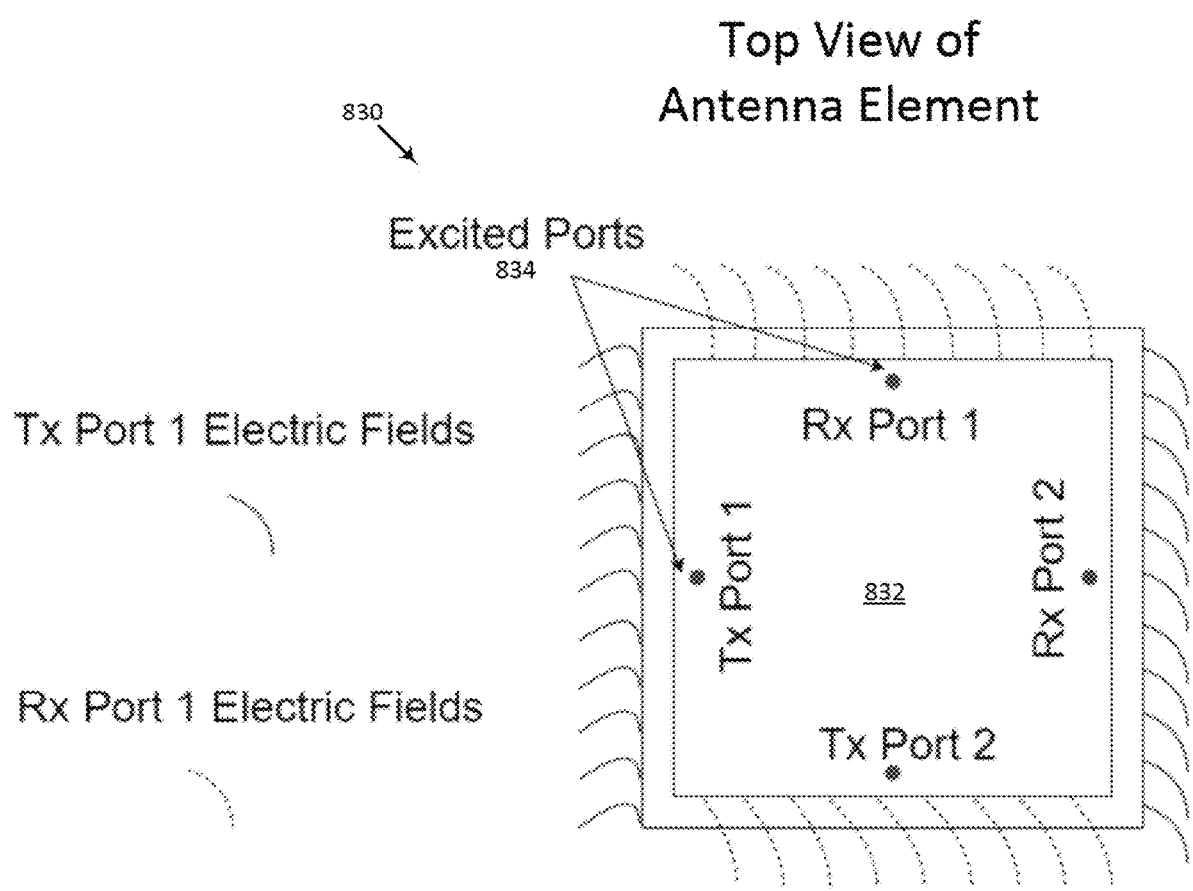
FIG. 8B illustrates a top view of a full-duplex antenna element, according to some embodiments.

FIG. 8B shows the electric fields that are produced in this example. FIG. 8B illustrates a top view of an antenna element, according to some embodiments. As shown, antenna element 830 includes four-port antenna 832 with two excited ports 834. FIG. 8B illustrates another example of a four-port antenna for use in full-duplex communications, according to some embodiments. As shown, four-port antenna 832 includes two excited ports 834.

While four-port antenna 832 is shown, the RFICs are not. When two ports 834 are excited, the electric fields radiate and induce coupling. Those ports can be driven orthogonally, as shown, to avoid coupling. In order to maintain orthogonality with different polarizations, it is possible to use the phase and amplitude controls of beamforming Tx RFIC 810 and Rx RFIC 812 to maintain an orthogonal polarization between the Tx beam and the Rx beam.

For example, embodiments that use linear polarization use the following rules:

$P_{Tx1} = P_{Tx2} = P_{Rx1} = P_{Rx2}$ $A_{Tx1} = A_{Rx1}$ $A_{Tx2} = A_{Rx2}$

Embodiments that use circular, on the other hand, use the following rules:

$P_{Tx1} = P_{Tx2} +/- 90$ degrees.

$P_{Rx1} = P_{Rx2} +/- 90$ degrees.

$A_{Tx1} = A_{Rx1} = A_{Tx2} = A_{Rx2}$.

Figure 8C:
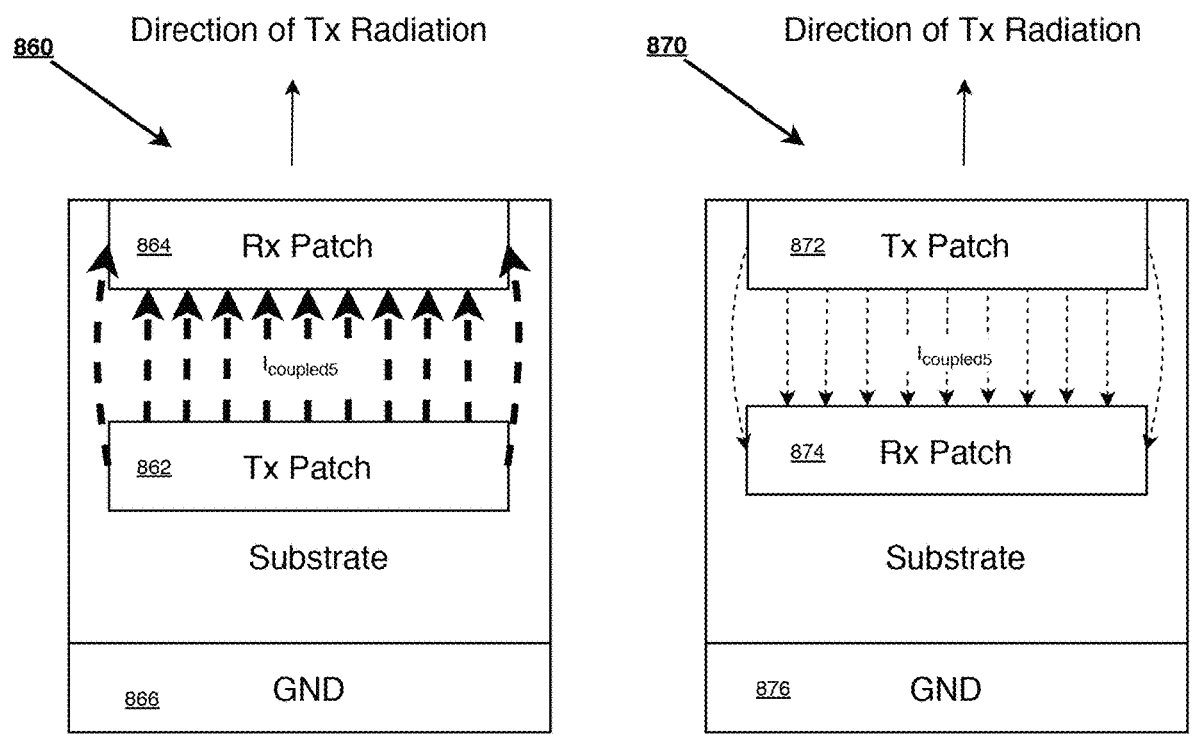
FIG. 8C illustrates cross-sectional views of two Tx-Rx antennas with two different relative positions of Tx and Rx antennas, according to some embodiments.
Figure 8C:
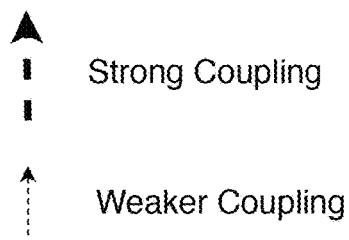

FIG. 8C illustrates cross-sectional views of two antenna elements with two different relative positions of Tx and Rx patches, according to some embodiments. As shown, antenna element 860 includes Rx patch 864, disposed above Tx patch 862, disposed above a ground layer 866. In contrast, antenna element 870 includes Tx patch 872, disposed above Rx patch 874, disposed above a ground layer 876.

In operation, antenna element 860 is expected to exhibit stronger coupling from Tx patch 862 to Rx patch 864 (e.g., $I_{coupled5}$) because the Tx radiation must pass through the Rx patch 864. Antenna element 870, on the other hand, is expected to exhibit only weak coupling from Tx patch 872 to Rx patch 874 (e.g., $I_{coupled5}$) because the Tx radiation need not pass through antenna 874.

Using a 4-port antenna like the one shown in FIG. 8A has many advantages compared to a traditional circular patch antenna, including wider bandwidth and simpler design. Among the advantages of using the 4-port antenna shown in FIG. 8A is that using a dual linear antenna and an RFIC that has at least two ports provides the ability to control phase and amplitude, and, ultimately, polarization agility. Such capability is particularly advantageous when compared with Circularly Polarized (CP) feeding of an antenna trying to have the 90-degree phase shift within the antenna.

2. Parasitic Structures to Improve $I_{coupled5}$

Figure 9A:
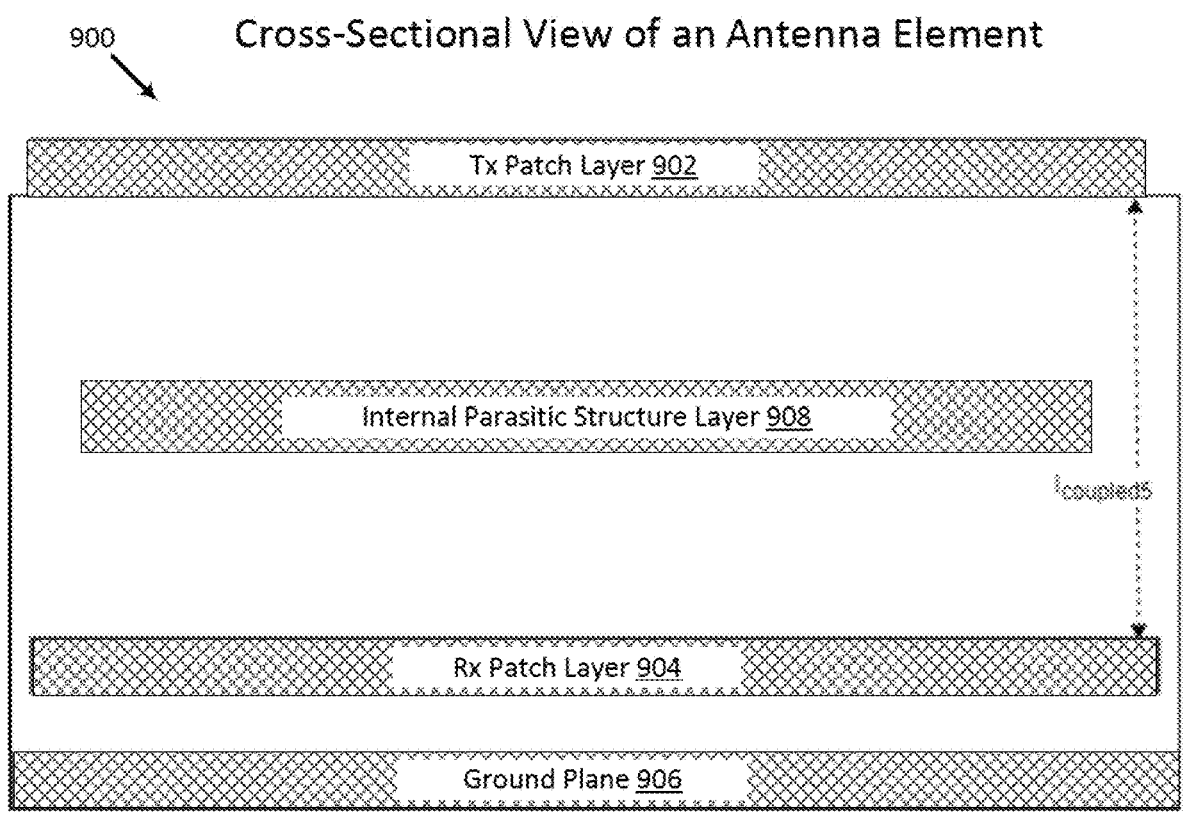
FIG. 9A illustrates a cross-sectional view of an antenna element with an internal parasitic structure, according to some embodiments.

FIG. 9A illustrates a cross-sectional view of an antenna element, according to some embodiments. As shown, antenna 900, similarly to antenna element 870 (FIG. 8C), includes Tx antenna layer 902, disposed above Rx antenna layer 904, disposed above ground layer 906. But here, antenna 900 further includes internal parasitic structure layer 908 disposed between Tx antenna layer 902 and Rx antenna layer 904. In some embodiments, internal parasitic structure layer 908 is disposed between Tx antenna and Rx antenna, and on which a parasitic structure can be etched. Advantageously, internal parasitic structure layer 908 is expected to improve $I_{coupled5}$ (the coupling from the Tx antenna onto the Rx antenna, as shown in FIG. 4A) at the critical frequency, $f_{critical}$. Of further advantage, internal parasitic structure layer 908 is expected to not adversely impact the performance of the Tx or Rx Antenna Patches.

In some embodiments, internal parasitic structure layer 908 is etched in a PCB (printed circuit board) along the x-y plane using standard PCB manufacturing techniques and is placed in between Tx antenna layer 902 and Rx antenna layer 904. Internal parasitic structure layer 908 can also be constructed to surround the patches, and not necessarily confined directly in between them.

In other embodiments, not shown, multiple internal parasitic structures can be stacked on top of each other, thereby forming a more complex internal parasitic structure in order to achieve an equivalent RLC (Resistance, Inductance, Capacitance) resonance value and advantageously improve $I_{coupled5}$.

Figure 9B:
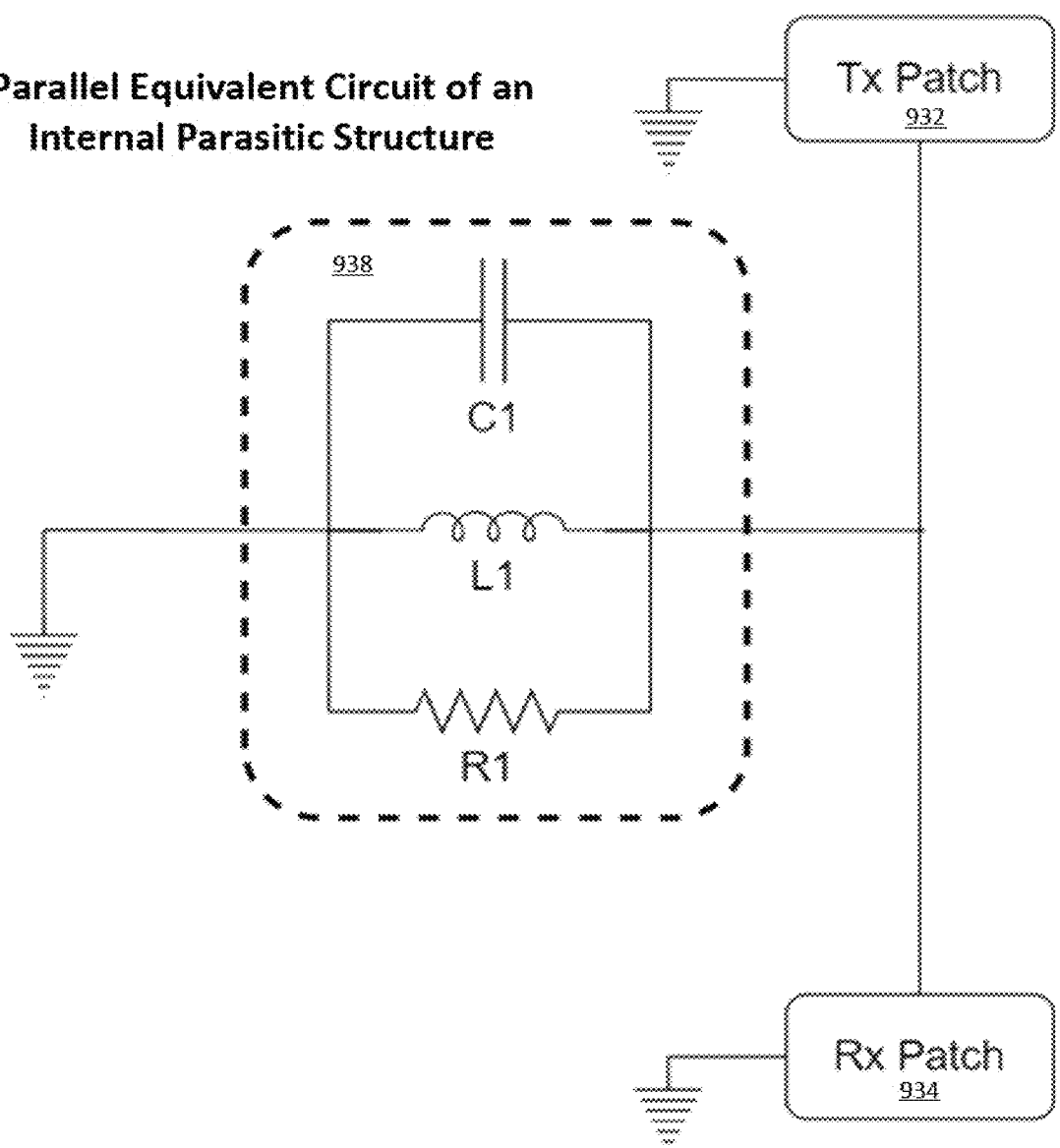
FIG. 9B illustrates an equivalent circuit of an internal parasitic structure layer, as used in some embodiments.

FIG. 9B illustrates a parallel equivalent circuit of an internal parasitic structure layer, as used in some embodiments. As shown, antenna element 930 includes Tx patch 932, Rx patch 934, and equivalent circuit 938, representing attributes of an internal parasitic structure layer (not shown) disposed between the patches. Using equivalent circuit 938, a parallel RLC1 circuit can be used to model a degree to which coupled signals at $f_{critical}$ can be absorbed through the internal parasitic structure layer to GND as opposed to going directly to Rx Antenna, and therefore improving $I_{coupled5}$. It is to be noted that the RLC1 equivalent circuit is a simplification of an equivalent circuit, in which other equivalent circuitry such as additional resistive and radiative losses are omitted.

Figure 9C:
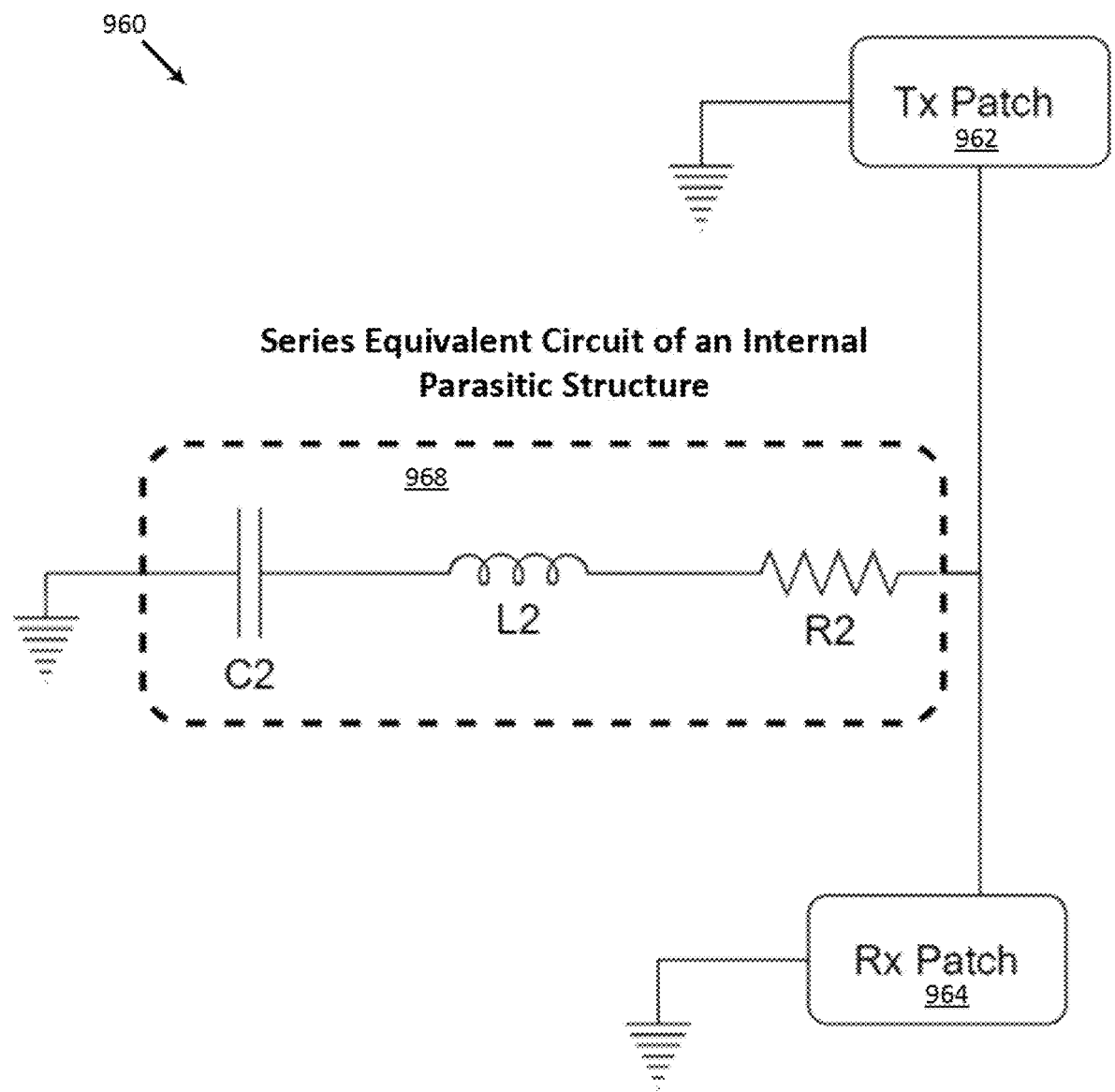
FIG. 9C illustrates another equivalent circuit of an internal parasitic structure layer, as used in some embodiments.

FIG. 9C illustrates a series equivalent circuit of an internal parasitic structure layer, as used in some embodiments. As shown, antenna element 960 includes Tx patch 962, Rx patch 964, and equivalent circuit 968, representing electronic characteristics of an internal parasitic structure layer (not shown) disposed between the patches. Here, equivalent circuit 968 models' attributes of the internal parasitic structure layer using series connections of C, R, L. Equivalent circuit 968 can be used to similar advantage as equivalent circuit 938 (FIG. 9B).

As shown, equivalent circuit 938 and 968 provide a path for undesired frequencies near $f_{critical}$ to be absorbed to GND as opposed to going directly to the Rx patch, and therefore improving $I_{coupled5}$.

3. Parasitic structures to Improve $I_{coupled6}$

Figure 10A:
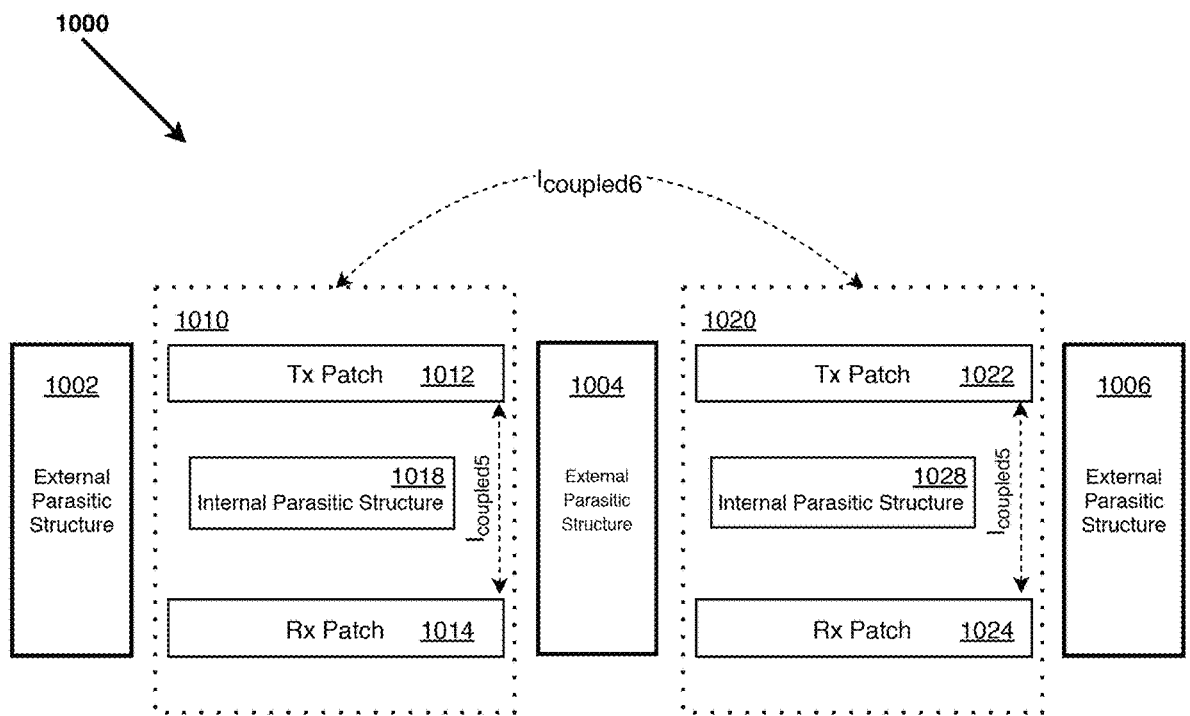
FIG. 10A illustrates a side view of two antenna elements with internal and external parasitic structures, according to some embodiments.

FIG. 10A illustrates a side view of two antenna elements, according to some embodiments. As shown, antenna panel 1000 includes antenna element 1010, which includes Tx patch 1012, Rx patch 1014, and internal parasitic structure 1018, and Tx-Rx antenna 1020, which includes Tx patch 1022, Rx patch 1024, and internal parasitic structure 1028. Here, external parasitic structures 1002, 1004, and 1006 are disposed between and around Tx-Rx antennas 1010 and 1020. Each of the external parasitic structures 1002, 1004, and 1006 acts as an isolating structure which reduces the coupling $I_{coupled6}$ between a pair of antenna elements. In some implementations, a pattern is etched in between adjacent antenna elements and creates an isolation structure that improves $I_{coupled6}$ at the critical frequency, $f_{critical}$.

Figure 10B:
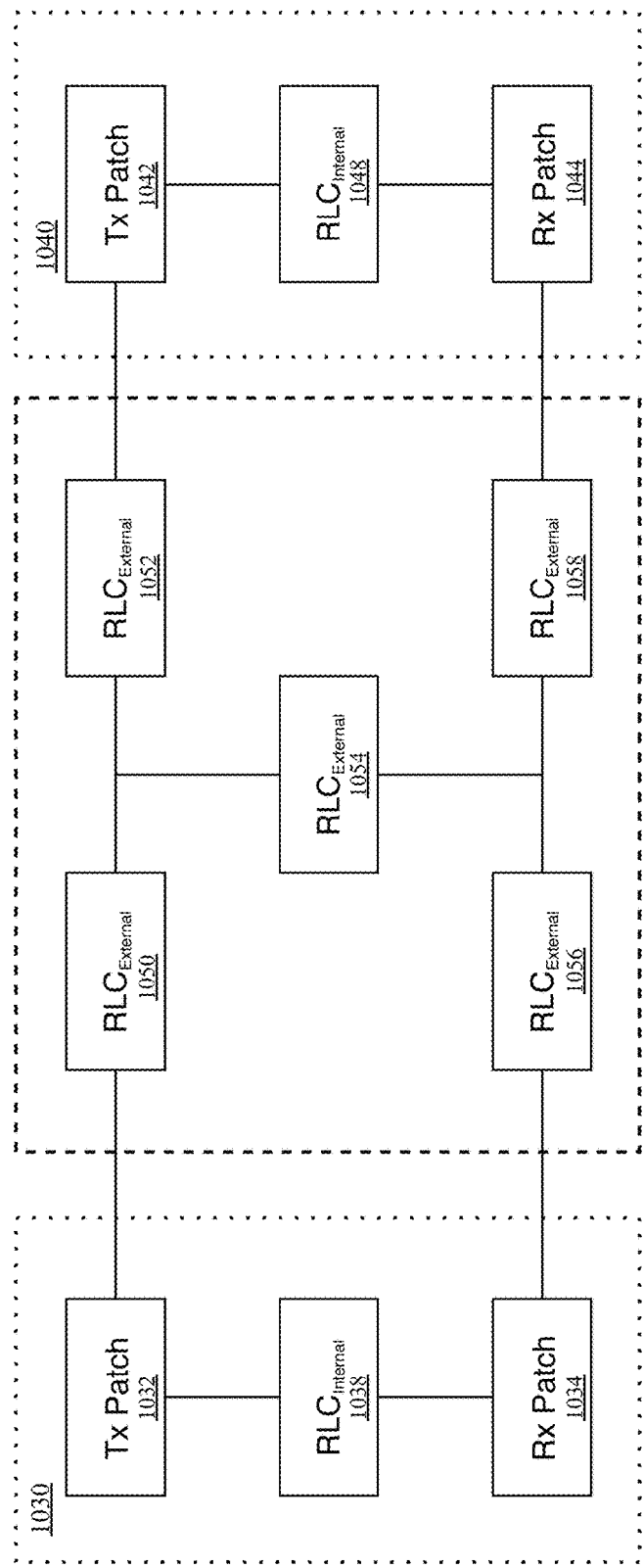
FIG. 10B shows a simplified equivalent circuit for an antenna element with an external parasitic structure, according to some embodiments.

FIG. 10B shows a simplified equivalent circuit for an antenna element with an internal parasitic structure, according to some embodiments. Each RLC block can be designed for the frequency of the application. As shown, the simplified RLC equivalent models Tx-Rx antenna 1030, which includes Tx patch 1032, Rx patch 1034, and RLCinternal 1038, and Tx-Rx antenna 1040, which includes Tx patch 1042, Rx patch 1044, and RLCinternal 1048. Also included are equivalent RLC models for external parasitic structures 1050, 1052, 1054, 1056, and 1058. Advantageously, an RLC circuit, arranged either in series or parallel, can be realized in a PCB by adjusting the patterning of the PCB manufacturing using a combination of via drilling and etching techniques.

Figure 10C:
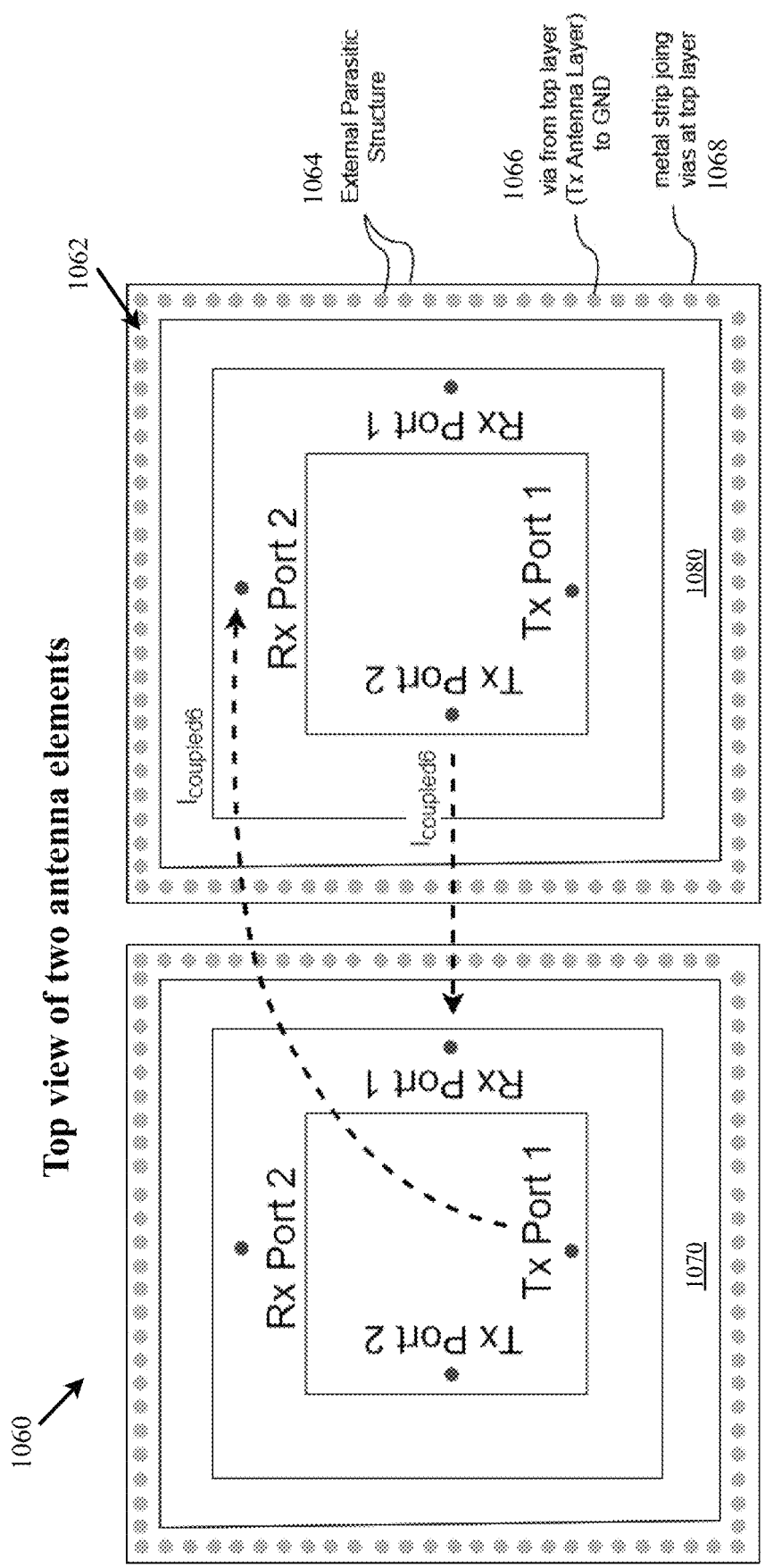
FIG. 10C illustrates a top view of two antenna elements, according to some embodiments.

FIG. 10C illustrates a top view of two antenna elements, according to some embodiments. As shown, external parasitic structure 1060 is realized in part by a ring of vias 1062 around each of antenna elements 1070 and 1080, which are each connected to external parasitic structures 1064 etched on the layers in between the top layer and the bottom GND layer. Some vias, such as via 1066, are from a top layer (Tx antenna layer) to GND. The ring of vias 1062 are in turn joined at the top layer, the same layer as the Tx antenna layer, by metal strip 1068. The via spacing should be less than $\lambda/8$, where $\lambda$ (lambda) is the wavelength corresponding to $F_{TxMax}$, the highest frequency in the Tx band. This creates a vertical via wall structure that acts as an isolation structure between adjacent antennas in the array, which improves isolation $I_{coupled6}$, which in turn improves $I_{effective6}$.

4. Distribution Network Isolation to Improve $I_{coupled1}$ and $I_{coupled2}$

Figure 11A:
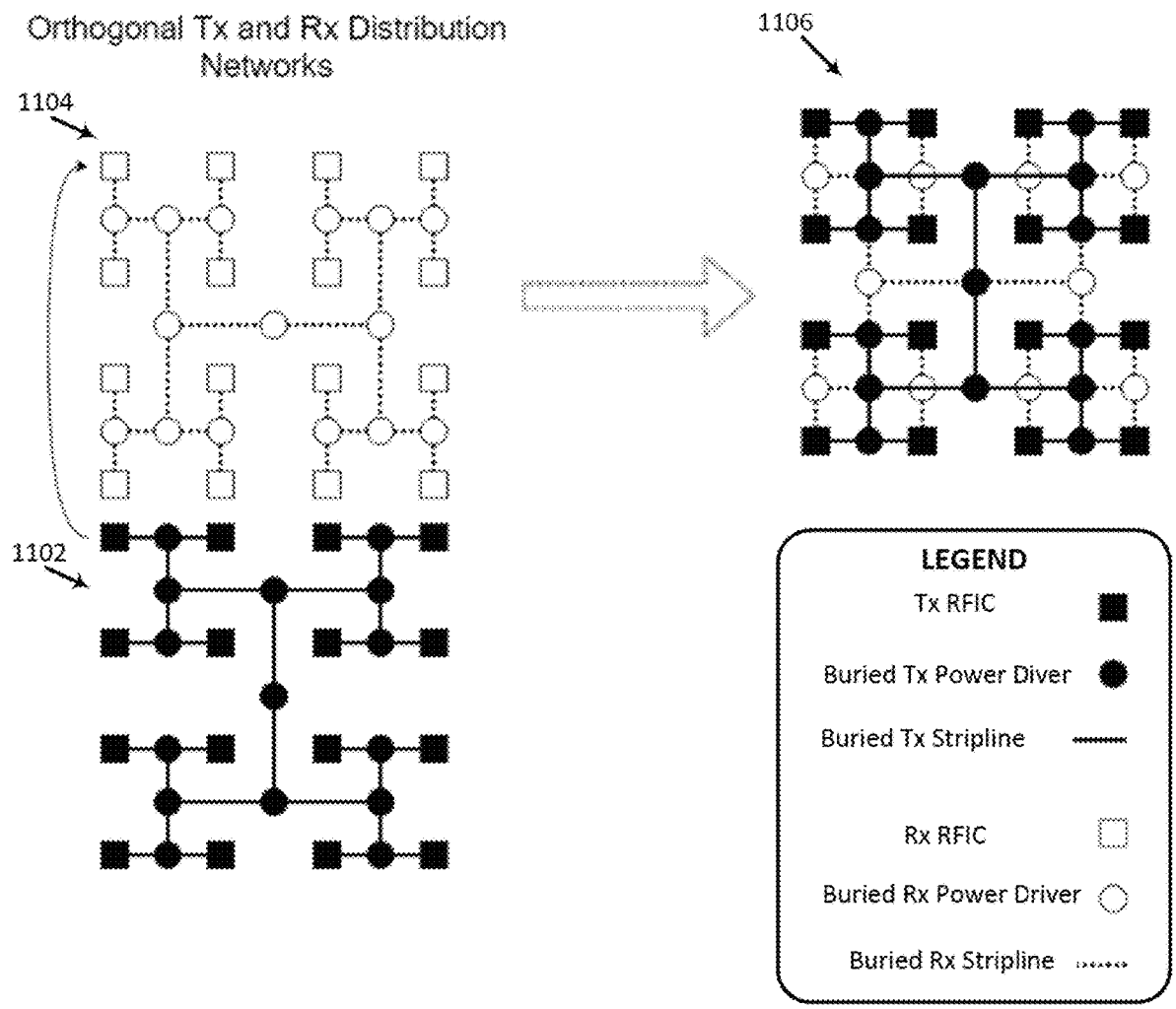
FIG. 11A shows an example of a Distribution Network for a module PCB, according to some embodiments.

FIG. 11A shows an example of a Distribution Network for a module PCB, according to some embodiments. As shown, the Tx distribution network 1102 and Rx distribution network 1104 have the same shape but are rotated 90 degrees from each other and routed on two different layers. Also shown is top view 1106, which represents embodiments in which Tx distribution network 1102 is disposed above Rx distribution network 1104. The orthogonality and ground shielding provide advantageous isolation that can improve $I_{coupled1}$ and $I_{coupled2}$.

For ease of illustration, Tx distribution network 1102 and Rx distribution network 1104 are shown separated and are also shown in top view 1106 as they would appear stacked. In other words, 1106 illustrates a top view that results when a Tx RFIC is placed on top of an Rx RFIC.

In some embodiments, the buried Tx and Rx power dividers are implemented using a Wilkinson design, which is a standard 3-port RF device that splits or combines signals. For this antenna system, no termination resistor is necessary on the outer layer of the PCB because the operation of the antenna system guarantees that the two signals being combined have exactly the same amplitude and phase, thereby producing no reflections. This advantageously allows for an internal stripline power divider that can be simulated for the frequency band of use, which improves isolation $I_{coupled1}$.

Figure 11B:
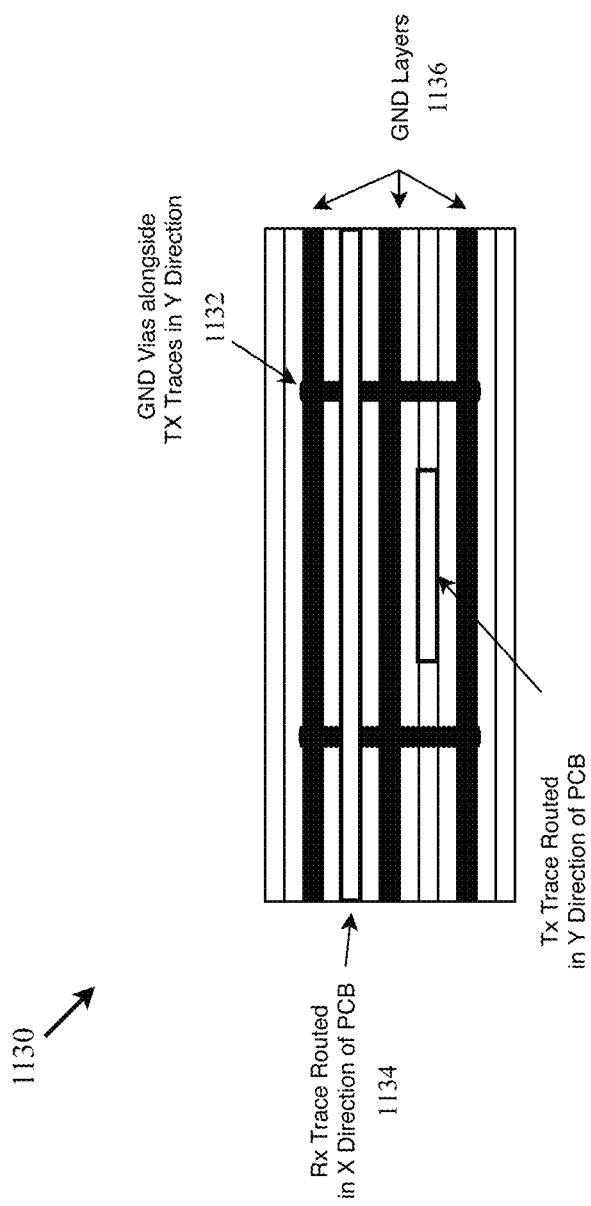
FIG. 11B illustrates a side view of a Tx-Rx antenna stack up, according to some embodiments.

FIG. 11B illustrates a side view of an antenna element stack-up 1130, according to some embodiments. As shown, Tx traces 1132 and Rx traces 1134 and their distribution networks are placed on distinctly different PCB layers, where there is at least one ground plane 1136 separating them, and vias running along-side the traces to form a stripline coplanar waveguide.

5. Antenna with Integrated Filter to Implement $I_{filtered4}$

Figure 12A:
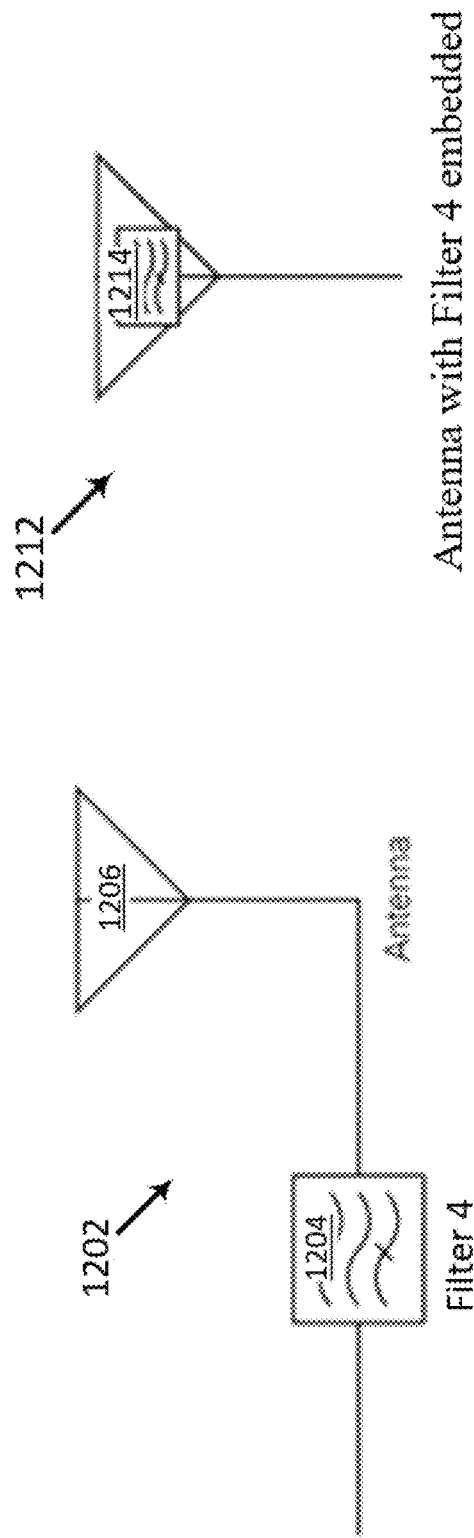
FIG. 12A illustrates Filter 4 embedded into an antenna, according to some embodiments.

FIG. 12A illustrates Filter 4 used in an antenna, according to some embodiments. As shown at 1202, Filter 4 1204 (which is an example of Filter 4 416 of FIG. 4A) is in series with Antenna 1206. But also shown is antenna 1212 with Filter 4 1214 embedded, in which the filter does not occupy additional space and can advantageously be fully embedded in the antenna.

Figure 12B:
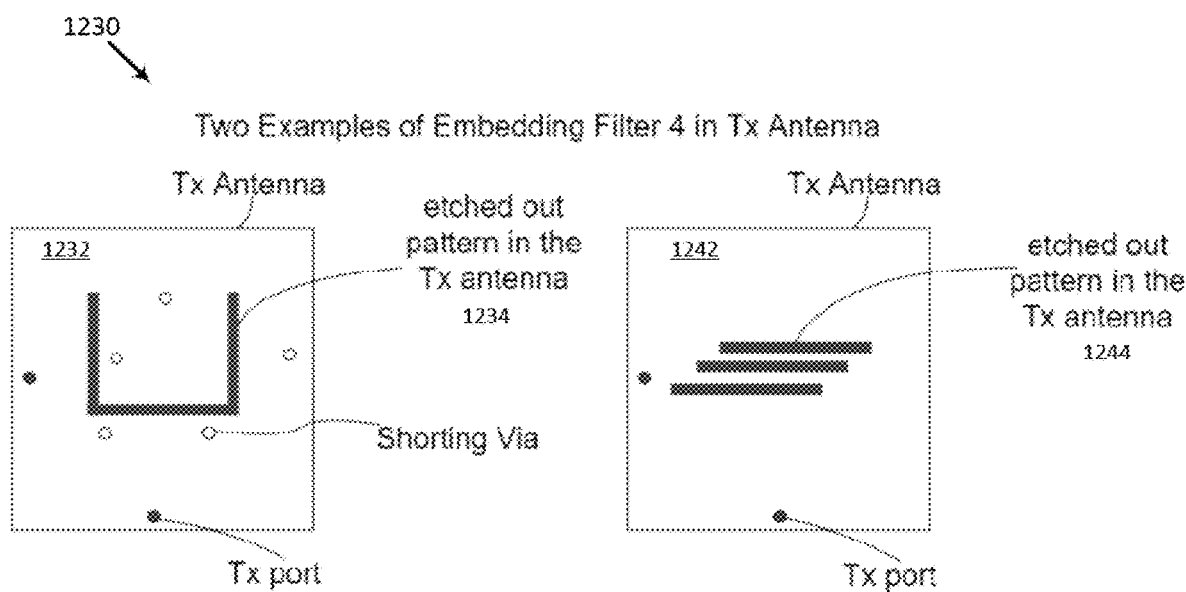
FIG. 12B shows examples of the implementation of embedding Filter 4, according to some embodiments.

FIG. 12B shows examples of the implementation of embedding Filter 4, according to some embodiment. As shown in 1230, a pattern in the Tx antenna is etched out, producing a non-radiating resonant filter. As shown, in Tx antenna 1232 a U-shaped pattern 1234 has been etched out. In Tx antenna 1242, on the other hand, a pattern of rows 1244 has been etched out to serve as Filter 4. Advantageously, Filter 4, as embedded in either Tx antenna 1232 or Tx antenna 1242, is expected to provide some degree of isolation of a Tx signal from nearby Rx antennas, Rx elements, and Rx signal paths.

Figure 12C:
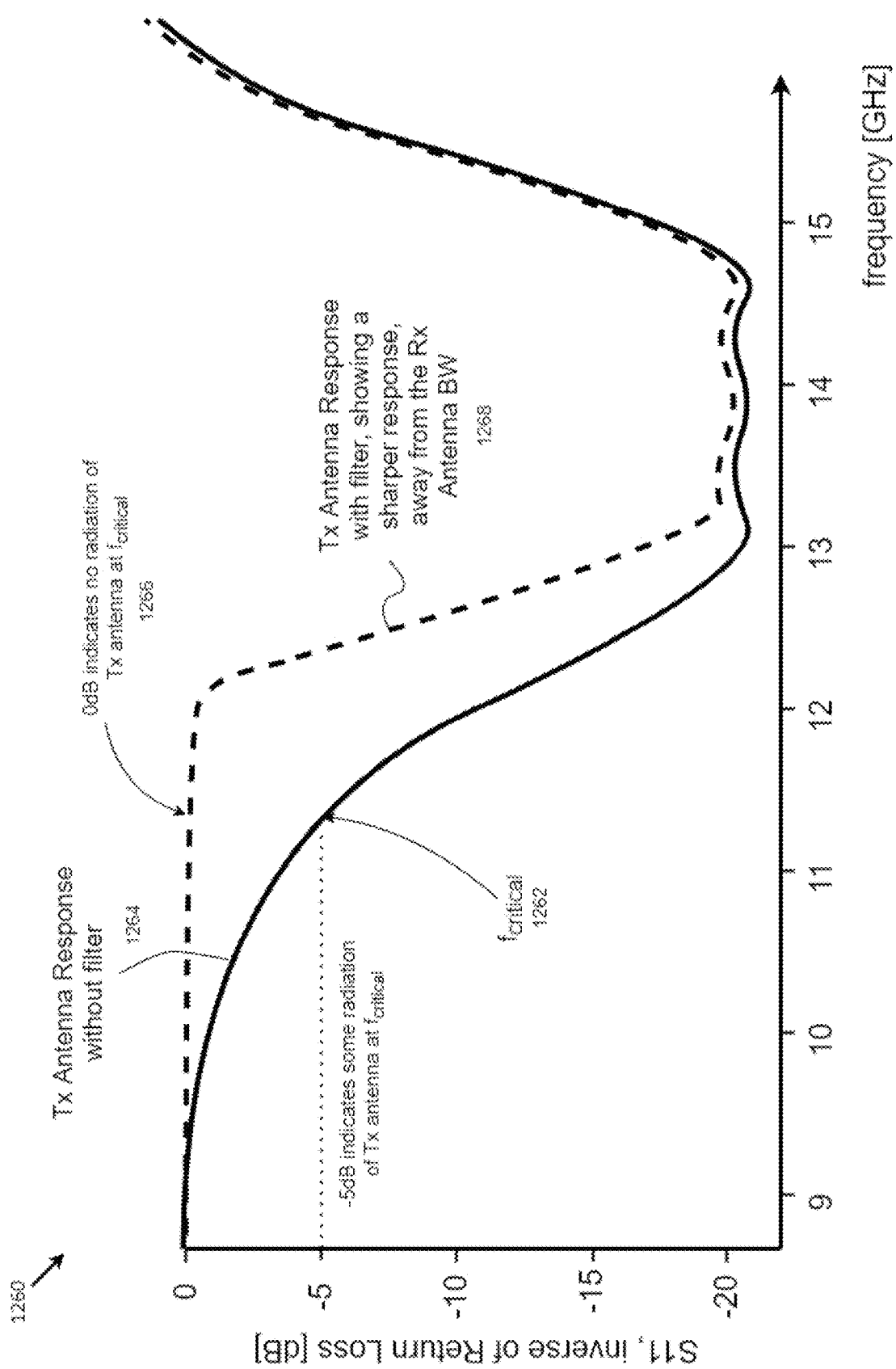
FIG. 12C illustrates an embodiment of a Tx antenna response with Filter 4 embedded.

FIG. 12C illustrates the frequency response (1260) of a Tx antenna with Filter 4 (1266) and without Filter 4 (1264). The vertical axis is the S11 measurement, equivalent to the inverse of the return loss, and is an indication of the amount of energy that is radiated from the antenna at that frequency, where lower S11 means higher radiated power.

In FIG. 12C, the Tx antenna response 1264 without a filter yields a Return Loss at $f_{critical}$ (1262) of −5 dB, which means that some power is radiated at this frequency. FIG. 12C also plots the Tx antenna response with the embedded filter, yielding a sharper response 1268 away from the Rx antenna bandwidth, and a Return Loss at $f_{critical}$ (1266) is near 0 dB, indicating that nearly zero power is being radiated by the Tx antenna at $f_{critical}$ This means that the presence of Filter 4 helps to avoid radiating power and coupling to nearby Rx antennas. Filter 4 improves isolation by improving $I_{effective5}$ and $I_{effective6}$. In other embodiments, not shown, the implementation of the etched-out pattern is used to miniaturize Tx antenna and Rx antenna. The etching out of certain patterns in Tx antenna and Rx antenna produces a smaller antenna at the same design frequency, which improves $I_{effective5}$ as there is less physical surface for the coupling of the energy among the antennas in an array.

6. High-Density Integrated PCB Notch Filter to Implement $I_{filtered2}$ and $I_{filtered7}$ A notch filter can be used to implement Filter 2, which is an example of Filter 2 410 (FIG. 4A), In some embodiments, the stub can be used to filter out frequencies near $f_{critical}$. Filter 2 provides an advantage of disclosed embodiments insofar as it filters out the frequency skirt, which is generated by the PA (such as power amplifier 408 of FIG. 4A), due to the PA's nonlinear nature. Filter 2, because of its location after the PA, can improve the isolation at coupling channels $I_{coupled3}$, $I_{coupled4}$, $I_{coupled5}$, and $I_{coupled6}$. An advantage of the embedded design of disclosed embodiments is eliminating the need to install an off-the-shelf Filter 3, which would be too large for use at the element level and would be very costly. In addition, an integrated filter can be placed closer to the RFIC than any component filter, which is expected to improve the isolation at coupling channel $I_{coupled3}$.

A notch filter design can provide an advantage of disclosed embodiments because it is compact and simple. In some embodiments, it would be a bandpass filter (to filter out the entire Rx frequency band, such as Rx bandwidths 512, 542, and 572 of FIGS. 5A-5C), but a notch filter placed at $f_{critical}$ will can provide sufficient isolation around $f_{critical}$, and the falling frequency skirt of the Tx signal within the Rx frequency band will fall below the noise floor, so that performance of the system will not be compromised.

In some embodiments, Filter 2 is located on only one plane of the PCB, and therefore takes up a lot of space on the outer layers of the PCB, where there is already limited space for RFICs due to the element spacing requirements of the technology. As such, building a full-duplex antenna system may not be possible.

Figure 13:
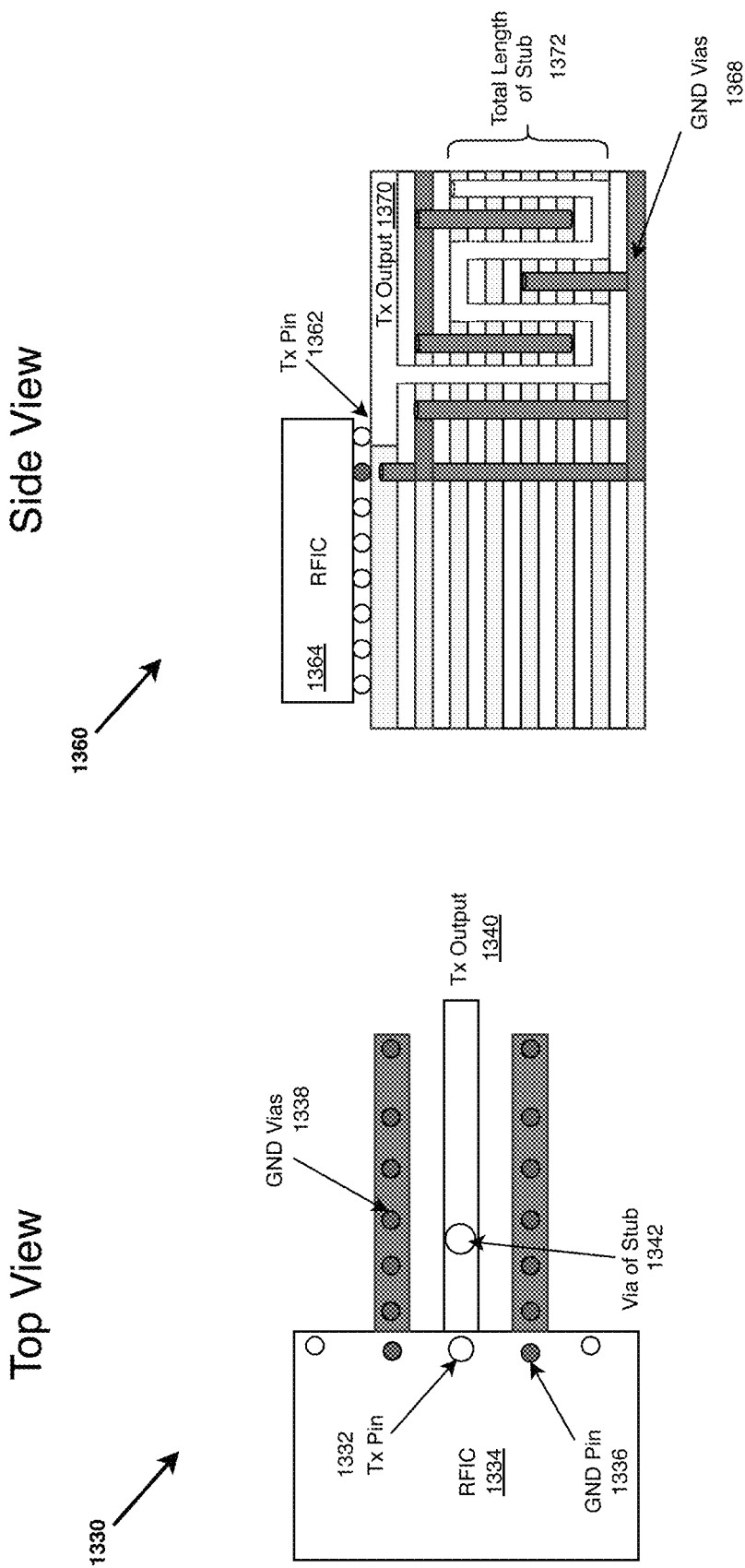
FIG. 13 illustrates an example implementation of a high-density integrated PCB Filter 2, according to some embodiments.

FIG. 13 illustrates an example implementation of Filter 2, according to some embodiments. Illustrated is a top view 1330 of Filter 2, which shows Tx pin 1332, RFIC 1334, GND pin 1336, GND vias 1338, Tx output 1340, and via of stub 1342. Also illustrated is a side view 1360 of Filter 2, which shows Tx pin 1362, RFIC 1364, GND vias 1368, Tx output 1370, and total length of stub 1372. As shown, Filter 2 1330 is a High-Density Integrated PCB Notch Filter, which uses many layers of the PCB.

Some implementations of Filter 2 1360 offer several advantages. First, for example, Filter 2 1360 takes up little space on the outer layer of the PCB, so it is fit for applications that require filtering very close to the pins of a multi-output RFIC. Second, the stub is routed in the vertical direction of the PCB in a serpentine pattern to realize the full length of the stub. Third, the signal vias' and traces' length and widths can be adjusted to achieve desired performance. Fourth, GND vias placed around the structure prevent coupling from the structure to other sensitive traces.

Figure 14A:
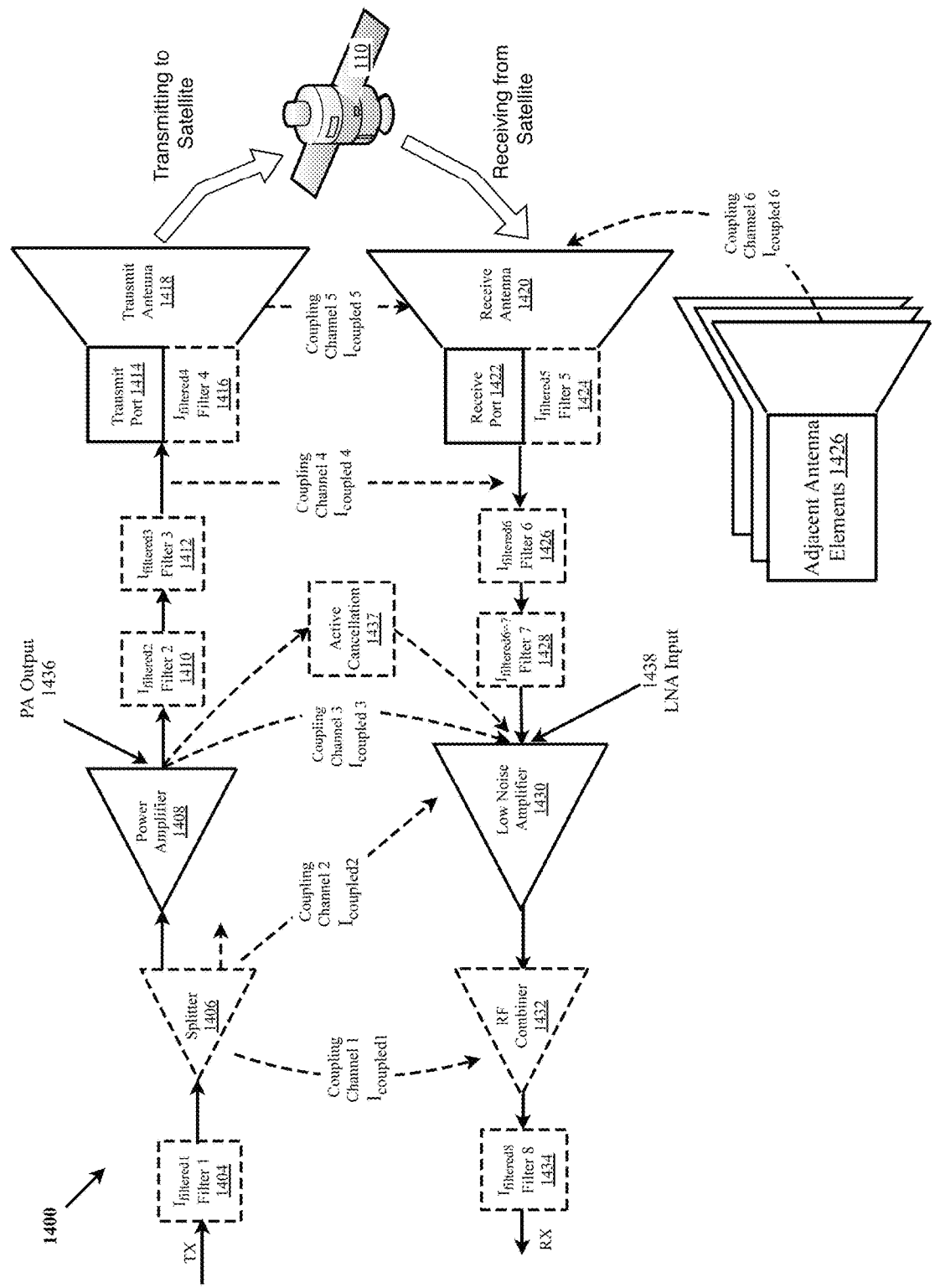
FIG. 14A is a block diagram illustrating a full-duplex antenna system with active cancellation of the Tx signal, according to some embodiments.

7. Active Cancellation to Improve $I_{coupled3}$, and $I_{coupled4}$ and $I_{coupled5}$ FIG. 14A illustrates a Tx-Rx antenna with active cancellation of the Tx signal, according to some embodiments. As shown, antenna element 1400 includes a transmit signal path, which includes, connected in order, a Tx port (to receive an analog input from a modem of a user device), Filter 1 1404, splitter 1406, power amplifier 1408, Filter 2 1410, Filter 3 1412, Filter 4 1416, connected via transmit port 1414 to transmit patch antenna 1418. Also shown is a receive signal path includes, connected, in order, receive patch antenna 1420, connected via port 1422 to Filter 5 1424. which drives Filter 6 1426, which drives Filter 7 1428, which drives low noise amplifier 1430, which drives RF combiner 1432, which drives Filter 8 1434, which drives an Rx port (to provide as an analog output to the modem of the user device). It should be noted that the filters are each illustrated with dashed borders to signify that they are optional: each can be included as desired.

Also marked are location 1436, Pont at the output of PA 1408, and location 1438, $P_{in}$ at the input of LNA 1430. Also shown is active cancellation 1437, which receives a signal from location 1436 of the Tx signal path, and provides an antidote to location 1438 of the Rx signal path.

Figure 14B:
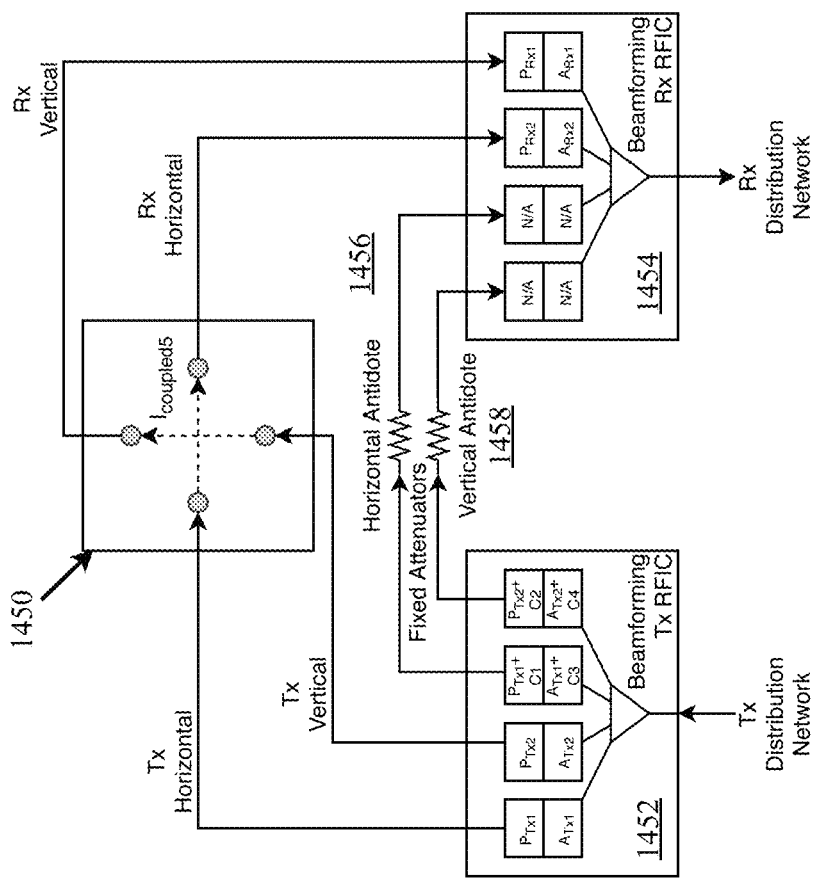
FIG. 14B illustrates a full-duplex antenna element with active cancellation of the Tx signal, according to some embodiments.

FIG. 14B illustrates an antenna element with active cancellation of the Tx signal, according to some embodiments. As shown, four-port antenna 1450 includes vertical and horizontal Tx and Rx ports and is connected to beamforming Tx RFIC 1452 to process a signal received from a Tx distribution network, and Rx RFIC 1454 to process a signal received by the Rx patch antenna. Both RFICs have twice as many ports to connect a horizontal antidote 1456 and vertical antidote 1458 from the Tx RFIC 1452 to the Rx RFIC 1454. Advantageously, disclosed embodiments can actively cancel the Tx signal that couples to the Rx signal path via Icoupled5 by adding an inverse copy of the Tx signal (antidote signal) back to the Rx signal chain, as shown in FIG. 14B. In the disclosed active cancellation circuit of Rx RFIC 1454, the antidote signal is tuned to be the same amplitude and opposite phase of the Tx signal that couples into the Rx signal path.

Active cancellation may be implemented using extra channels of the phase and amplitude processing chip, as shown in FIG. 14B. $P_{Tx1}$, $P_{Tx2}$ are the phases and $A_{Tx1}$, and $A_{Tx2}$ are the amplitudes of the Tx horizontal and vertical polarization. With these controls, the polarization of the Tx beam can be configured to be any linear or circular polarization. The same is true for the Rx polarizations by altering $P_{Rx1}$, $P_{Rx2}$, $A_{Rx1}$, and $A_{Rx2}$.

The other 2 phase and amplitude channels on each RFIC are used to inject the Antidote signal from Tx to Rx. The approximate amplitude is set by the fixed attenuator, and then the precise amplitude and phases C1, C2, C3, and C4 must be calibrated on a per-element basis for a particular module. The phase and amplitude control of the Rx RFIC does not necessarily have to be used.

After calibration, in embodiments that use this active cancellation method, the phase and amplitude controls of the antidote signals are tied to the phase and amplitude controls of the Tx signals so that the signal that enters the Rx RFIC is the same amplitude and opposite phase of the signal induced by $I_{coupled5}$ and $I_{coupled6}$, so that the two signals will destructively interfere.

This improves $I_{total}$ in a unique way compared to the other Isolation mechanisms, because it is active instead of passive.

8. Diplexer for Single Panel

Figure 15:
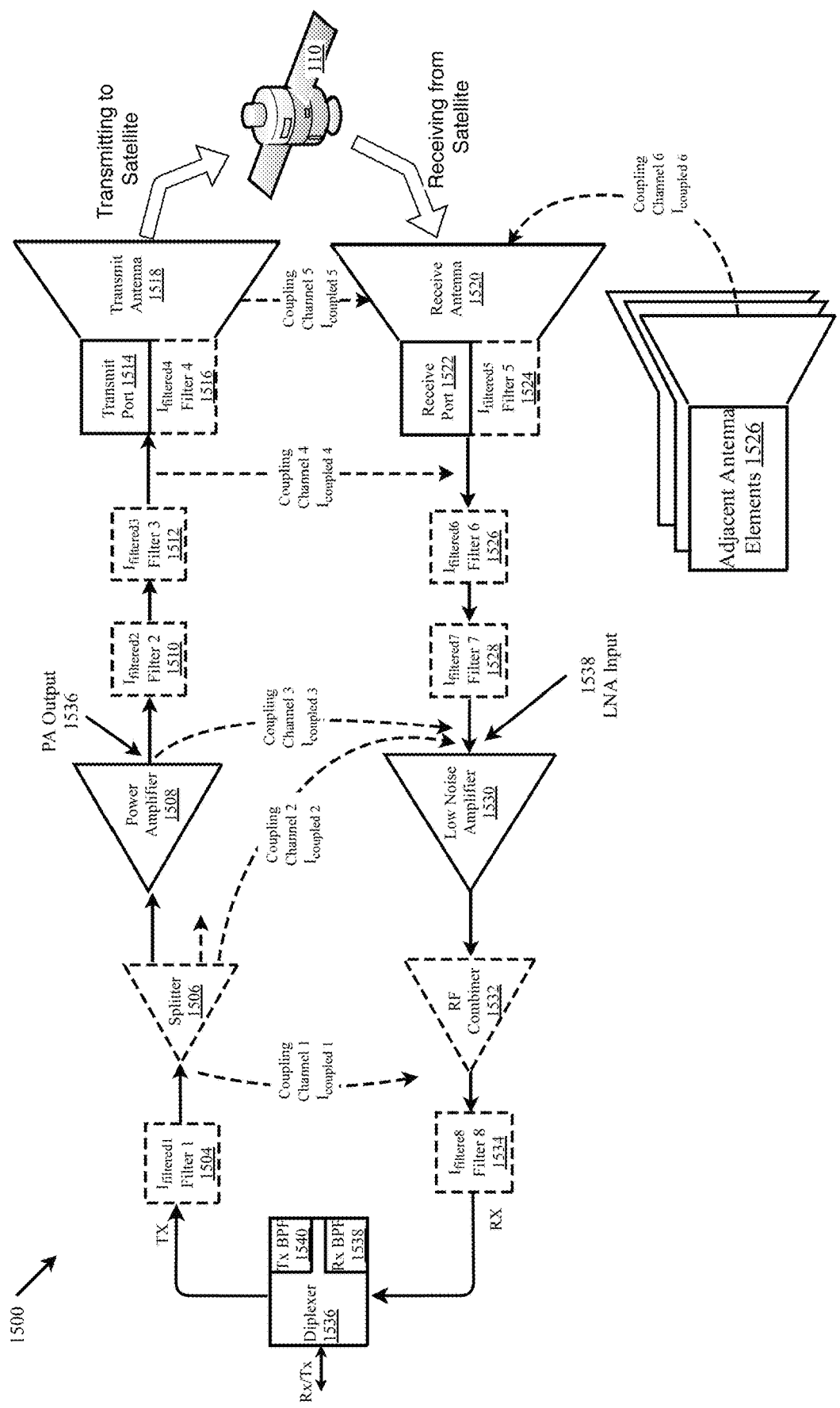
FIG. 15 is a block diagram illustrating a full-duplex antenna system with a Diplexer, for use in full-duplex communication, according to some embodiments.

FIG. 15 is a block diagram illustrating an antenna system for use in full-duplex communication, according to some embodiments. FIG. 15 includes a single Diplexer 1536 that advantageously creates a combined Rx/Tx signal that goes to a system that requires just one channel. Diplexer receives Tx and Rx and using an Rx BPF 1538 (Band Pass Filter) and a Tx BPF 1540, which isolates the two signal chains. Rx BPF 1538 and Tx BPF 1540 only allow the Rx and Tx signals to pass and remove the unwanted frequency components. If the diplexer provides equal or better isolation than the antenna system to which it is connected, full-duplex performance will not be compromised.

Transmit/Receive Signal Paths: As shown, antenna element 1500 includes a transmit signal path, which includes, connected in order, a Tx port (to receive an analog input from a modem of a user device), Filter 1 1504, splitter 1506, power amplifier 1508, Filter 2 1510, Filter 3 1512, Filter 4 1516, connected via transmit port 1514 to transmit patch antenna 1518. Also shown is a receive signal path includes, connected, in order, receive patch antenna 1520, connected via port 1522 to Filter 5 1524. which drives Filter 6 1526, which drives Filter 7 1528, which drives low noise amplifier 1530, which drives RF combiner 1532, which drives Filter 8 1534, which drives an Rx port (to provide as an analog output to the modem of the user device). Also marked are location 1536, $P_{out}$ at the output of PA 1508, and location 1538, $P_{in}$ at the input of LNA 1530.

Further Examples

The following examples describe various examples of configurations and embodiments of the disclosed invention, as described above.

Example 1 provides an exemplary full-duplex antenna system including: a controller; a transmit signal path including a distribution network and one or more elements each including a power amplifier, one or more filtering structures, one or more isolation structures, and a transmit port of a transmit patch antenna operating at a transmit frequency band to transmit an outgoing signal to a satellite; a receive signal path including another distribution network connected to the one or more elements each including a low-noise amplifier driven by a receive port of a receive patch antenna, one or more filtering structures, and one or more isolation structures operating at a receive frequency band to receive an incoming signal from the satellite, the receive frequency band being separated by a guard band from the transmit frequency band, and wherein the one or more filters together with isolation structures between the transmit signal path and the receive signal path provides sufficient isolation to reduce the amount of coupling between the transmit signal path and the receive signal path to allow the full-duplex antenna system to operate in a full-duplex mode at the maximum allowable data-rate.

Example 2 includes the substance of the exemplary full-duplex antenna system of Example 1, wherein the transmit signal path of each of the one or more elements includes, connected in sequence, a first filter, the distribution network, the power amplifier, and the transmit port of the transmit patch antenna.

Example 3 includes the substance of the exemplary full-duplex antenna system of Example 1, wherein the transmit signal path of each of the one or more elements includes, connected in sequence, the power amplifier, a second filter, and the transmit port of the transmit patch antenna.

Example 4 includes the substance of the exemplary full-duplex antenna system of Example 1, wherein the transmit signal path of each of the one or more elements includes, connected in sequence, the power amplifier, a second filter, and the transmit port of the transmit patch antenna, and further including a third filter between the second filter and the transmit port of the transmit patch antenna, the third filter to be included as a backup filter if the second filter does not provide enough isolation between the transmit and receive signal path.

Example 5 includes the substance of the exemplary full-duplex antenna system of Example 1, wherein the transmit signal path of each of the one or more elements includes, connected in sequence, the power amplifier, a fourth filter, and the transmit port of the transmit patch antenna, wherein the fourth filter is placed as close as possible to the transmit port.

Example 6 includes the substance of the exemplary full-duplex antenna system of Example 1, wherein the receive signal path of each of the one or more elements includes, connected in sequence, the receive port of the receive patch antenna, a fifth filter, and the low noise amplifier, wherein the fifth filter is placed as close as possible to the receive port.

Example 7 includes the substance of the exemplary full-duplex antenna system of Example 1, wherein the receive signal path of each of the one or more elements includes, connected in sequence, the receive port of the receive patch antenna, a sixth filter, and the low noise amplifier.

Example 8 includes the substance of the exemplary full-duplex antenna system of Example 1, wherein the receive signal path of each of the one or more elements includes, connected in sequence, the receive port of the receive patch antenna, a sixth filter, and the low noise amplifier, and further including a seventh filter between the sixth filter and the low noise amplifier, the seventh filter to be included as a backup filter if the sixth filter does not provide enough isolation between the receive port of the antenna and the low noise amplifier.

Example 9 includes the substance of the exemplary full-duplex antenna system of Example 1, wherein the receive signal path of each of the one or more elements includes, connected in sequence, the receive port of the receive patch antenna, the low noise amplifier, and an eighth filter.

Example 10 includes the substance of the exemplary full-duplex antenna system of Example 1, wherein the transmit frequency band is separated from the receive frequency band by a guard band of at least 1 Hz.

Example 11 includes the substance of the exemplary full-duplex antenna system of Example 1, wherein the transmit patch antenna of each of the one or more elements is disposed above the receive patch antenna of the element.

Example 12 includes the substance of the exemplary full-duplex antenna system of Example 1, wherein the receive patch antenna of each of the one or more elements is disposed above the transmit patch antenna of the element.

Example 13 includes the substance of the exemplary full-duplex antenna of Example 1, wherein each of the one or more elements further includes active circuitry to process incoming signals and outgoing signals, as controlled by the controller.

Example 14 includes the substance of the exemplary full-duplex antenna of Example 1, wherein each of the one or more elements further includes active circuitry to process incoming signals and outgoing signals, as controlled by the controller, wherein the elements of the active circuitry are mounted onto a module PCB to obviate the need for any connectors.

Example 15 includes the substance of the exemplary full-duplex antenna of Example 1, wherein each of the one or more elements of the transmit signal path are disposed at most 3 millimeters from the receive signal path.

Example 16 includes the substance of the exemplary full-duplex antenna of Example 1, wherein the transmit signal path of each of the one or more elements includes, connected in sequence, a first filter, the distribution network, the power amplifier, and the transmit port of the transmit patch antenna, wherein the receive signal path of each of the one or more elements includes, connected in sequence, the receive port of the receive patch antenna, the low noise amplifier; and eighth filter; and further including a diplexer to combine an Rx signal received from the eighth filter and a Tx signal being input to the first filter to communicate with a host device using a single Tx-Rx signal.

Example 17 provides an exemplary method including: providing a full-duplex antenna including: a controller, and a transmit signal path including one or more elements each including a power amplifier, one or more filters, and a transmit port of a transmit patch antenna operating at a transmit frequency band to transmit an outgoing signal to a satellite includes the substance of the exemplary one or more elements each further including a receive signal path including a low-noise amplifier driven by a receive port of a receive patch antenna operating at a receive frequency band to receive an incoming signal from the satellite, the receive frequency band being separated by a guard band from the transmit frequency band, and operating in a full-duplex mode, wherein the one or more filters together with a physical separation between the transmit signal path and the receive signal path provides sufficient isolation to reduce an amount of coupling between the transmit signal path and the receive signal path to allow the full-duplex antenna to operate in a full-duplex mode.

Example 18 provides an exemplary full-duplex antenna system including: including: a four-port (Transmit-Receive) antenna element including first and second Tx ports, first and second Rx ports, a substrate containing a Tx patch operating at a Tx bandwidth to transmit outgoing signals to a satellite, and an Rx patch simultaneously operating at an Rx bandwidth to receive incoming signals from the satellite includes the substance of the exemplary Tx bandwidth being separated by a guard band from the Rx bandwidth; a beamforming Tx RFIC (Radio-Frequency Integrated Circuit) to control a phase and an amplitude of first and second feed signals to the first and second Tx ports; a beamforming Rx RFIC to control a phase and an amplitude of first and second feed signals to the first and second Rx ports, such that a first beam fed to the first Tx RFIC has a polarization that is orthogonal to a second beam fed to the Rx RFIC, the orthogonal polarizations reducing an amount of coupling from the Tx ports to the Rx ports.

Example 19 includes the substance of the exemplary full-duplex antenna system of Example 18, wherein the beamforming Tx RFIC provides polarization agility over the first and second feed signals, obviating a need for the antenna to try to cause a ninety-degree phase shift internally.

Example 20 includes the substance of the exemplary full-duplex antenna system of Example 18, wherein the beamforming Tx RFIC is configured to receive a signal from a Tx distribution network, and to provide multiple corresponding outputs to the four-port antenna element.

Example 21 includes the substance of the exemplary full-duplex antenna system of Example 18, further including a beamforming Rx RFIC to process phases and amplitudes of signals received.

Example 22 includes the substance of the exemplary full-duplex antenna system of Example 18, wherein the Tx patch is disposed above the Rx patch in the substrate.

Example 23 includes the substance of the exemplary full-duplex antenna system of Example 18, further including a ground layer disposed in the substrate below the Tx patch and the Rx patch.

Example 24 includes the substance of the exemplary full-duplex antenna system of Example 18, wherein the Tx patch is disposed above the Rx patch, such that the outgoing signals being transmitted to the satellite do not pass through the Rx patch, reducing the coupling of the Tx patch onto the Rx patch.

Example 25 includes the substance of the exemplary full-duplex antenna system of Example 18, further including an internal parasitic structure layer disposed in a printed circuit board (PCB) between the Rx and Tx patches.

Example 26 includes the substance of the exemplary full-duplex antenna system of Example 18, further including one or more external parasitic structures disposed between the four-port Tx-Rx antenna and one or more adjacent antennas.

Example 27 includes the substance of the exemplary full-duplex antenna system of Example 18, wherein the beamforming Tx RFIC uses a signal received from a Tx distribution network to generate the feed signals to the first and second Tx ports, the system further including a beamforming Rx RFIC configured to process signals received from first and second Rx ports of the four-port antenna and generate a signal to provide to an Rx distribution network.

Example 28 includes the substance of the exemplary full-duplex antenna system of Example 18, wherein the four-port antenna element further includes a via wall structure on its periphery, the via wall structure realizing an external parasitic structure that reduces a coupling from the Tx patch onto one or more adjacent antennas.

Example 29 includes the substance of the exemplary full-duplex antenna system of Example 18; wherein the beamforming Tx RFIC uses a signal received from a Tx distribution network to generate the feed signals to the first and second Tx ports; the system further including a beamforming Rx RFIC configured to process signals received from first and second Rx ports of the four-port antenna and generate a signal to provide to an Rx distribution network; and wherein the beamforming Tx RFIC is further to generate a horizontal antidote and a vertical antidote including attenuated versions of the first and second Tx feed signals and to provide the vertical and horizontal antidotes to the beamforming Rx RFIC to be subtracted from vertical and horizontal Rx signals, respectively.

Example 30 provides an exemplary full-duplex antenna system including: a transmit (Tx) signal path including, connected in series, a Tx distribution network, a Tx RFIC (Radio Frequency Integrated Circuit), a first filter, a power amplifier, a second filter, a third filter, a fourth filter; and a Tx port of a Tx antenna configured to transmit an outgoing signal to a satellite; a receive (Rx) signal path including an Rx antenna to receive an incoming signal from the satellite, an Rx port of the Rx antenna, a fifth filter, a sixth filter, a seventh filter, a low noise amplifier, an eighth filter, and an Rx RFIC, the Tx antenna and the Rx antenna operating simultaneously but at different frequency bandwidths separated by a guard band, and Six coupling channels including $I_{coupled1}$ between Rx and distribution network traces, $I_{coupled2}$ between Tx signal path traces and Rx signal path components, $I_{coupled3}$ between Tx signal path elements and Rx signal path elements, $I_{coupled4}$ between Tx antenna feed and Rx antenna feed, $I_{coupled5}$ between the Rx and Tx antennas, and $I_{coupled6}$ between adjacent antennas.

Example 31 includes the substance of the exemplary full-duplex antenna system of Example 30, wherein the Tx RFIC and Rx RFIC are configured to ensure that Tx and Rx beams have orthogonal polarization.

Example 32 includes the substance of the exemplary full-duplex antenna system of Example 30, wherein the Tx antenna is disposed above the Rx antenna such that outgoing signals being transmitted to the satellite do not pass through the Rx antenna, thereby improving $I_{coupled5}$.

Example 33 includes the substance of the exemplary full-duplex antenna system of Example 30, further including an internal parasitic structure disposed between the Tx signal path and the Rx signal path, the internal parasitic structure causing an improvement of $I_{coupled5}$.

Example 34 includes the substance of the exemplary full-duplex antenna system of Example 30, wherein the Tx distribution network is separated from the Rx distribution network, thereby improving $I_{coupled1}$ and $I_{coupled2}$.

Example 35 includes the substance of the exemplary full-duplex antenna system of Example 30, wherein signal traces of the Tx signal path and the Rx signal path are separated by a ground plane in order to improve $I_{coupled1}$.

Example 36 includes the substance of the exemplary full-duplex antenna system of Example 30, wherein the second filter, being located after the power amplifier and before the Tx port, improves $I_{coupled3}$.

Example 37 includes the substance of the exemplary full-duplex antenna system of Example 30, wherein the second filter, being located after the power amplifier and before the Tx port, improves $I_{coupled4}$.

Example 38 includes the substance of the exemplary full-duplex antenna system of Example 30, wherein the second filter, being located after the power amplifier and before the Tx port, improves $I_{coupled4}$.

Example 39 includes the substance of the exemplary full-duplex antenna system of Example 30, wherein the second filter, being located after the power amplifier and before the Tx port, improves $I_{coupled4}$.

Example 40 includes the substance of the exemplary full-duplex antenna system of Example 30, further including an active cancellation circuit configured to receive a signal from the Tx signal path, just before the second filter, processes the signal, and provides an antidote to the Rx signal path, just before the low noise amplifier, active cancellation circuit to improve $I_{coupled4}$.

Example 41 includes the substance of the exemplary full-duplex antenna system of Example 30, further including an active cancellation circuit configured to receive a signal from the Tx signal path, just before the second filter, processes the signal, and provides an antidote to the Rx signal path, just before the low noise amplifier, active cancellation circuit to improve $I_{coupled5}$.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A full-duplex antenna system comprising:
    a transmit (Tx) signal path comprising:
        a Tx distribution network;
        one or more elements each comprising one or more power amplifiers;
        a first group of one or more filtering structures; and
        a Tx patch antenna having one or more Tx ports, the Tx patch antenna capable of operating at a Tx frequency band to transmit an outgoing signal to a satellite; and
    a receive (Rx) signal path comprising:
        an Rx distribution network;
        one or more elements each comprising one or more low-noise amplifiers;
        a second group of one or more filtering structures;
        an Rx patch antenna having one or more Rx ports, the Rx patch antenna capable of operating at a Rx frequency band to receive an incoming signal from the satellite; and
    one or more isolation structures interconnected between the Tx signal path and the Rx signal path;
    wherein the Rx frequency band is separated by a guard band from the Tx frequency band; and
    wherein the first and second groups of filtering structures in conjunction with the one or more isolation structures provide isolation to reduce an amount of coupling of signal power between the Tx signal path and the Rx signal path.

2. The full-duplex antenna system of claim 1, wherein the first group of one or more filtering structures comprises a filter disposed between a Tx port receiving an analog input from a modem of a user device and the Tx distribution network.

3. The full-duplex antenna system of claim 1, wherein the first group of one or more filtering structures comprises one or more filters disposed between the one or more power amplifiers and a Tx port of the Tx patch antenna.

4. The full-duplex antenna system of claim 1, wherein the second group of one or more filtering structures comprises one or more filters disposed between an Rx port of the Rx patch antenna and the one or more low-noise amplifiers.

5. The full-duplex antenna system of claim 1, wherein the second group of one or more filtering structures comprises one or more filters disposed between the Rx distribution network and an Rx port providing an analog output to a modem of a user device.

6. The full-duplex antenna system of claim 1, further comprising:
    a substrate comprising the Tx patch antenna, the Rx patch antenna and a ground layer into an integral antenna component;
    a beamforming Tx Radio-Frequency Integrated Circuit (RFIC) having outputs to the one or more Tx ports of the Tx patch antenna, the beamforming Tx RFIC including the one or more power amplifiers and a first group of phase control circuits; and
    a beamforming Rx RFIC with outputs to the one or more Rx ports of the Rx patch antenna, the beamforming Rx RFIC including the one or more low-noise amplifiers and a second group of phase control circuits.

7. The full-duplex antenna system of claim 6, wherein the beamforming Tx RFIC further including one of filtering structures from the first group of one or more filtering structures; and
    wherein the beamforming Rx RFIC further including one of filtering structures from the second group of one or more filtering structures.

8. The full-duplex antenna system of claim 6, wherein the integral antenna component comprises the Tx patch antenna being configured above the Rx patch antenna, and the Rx patch antenna being configured above the ground layer, thereby precluding the signal of the Tx patch antenna from passing through the Rx patch antenna.

9. The full-duplex antenna system of claim 6, wherein the integral antenna component comprises one or more internal parasitic structures disposed between the Rx patch antenna and the Tx patch antenna.

10. The full-duplex antenna system of claim 6, further comprising one or more external parasitic structures disposed between adjacent integral antenna components.

11. The full-duplex antenna system of claim 1, wherein the Tx distribution network and the Rx distribution network are disposed within a multilayered Printed Circuit Board (PCB), wherein the Tx distribution network and the Rx distribution network are disposed onto different layers of the multilayered PCB, and wherein the Tx distribution network and the Rx distribution network are configured perpendicular to each other.

12. The full-duplex antenna system of claim 1, wherein the Tx patch antenna further comprises an internal filter configured as a pattern etched out of the Tx patch antenna.

13. The full-duplex antenna system of claim 1, further comprising a diplexer to combine a Tx signal sent to the Tx signal path with an Rx signal received from the Rx signal path, the diplexer configured to connect to a port of a user device.

14. The full-duplex antenna system of claim 1, wherein the Tx signal path and the Rx signal path are disposed horizontally with a predetermined physical separation, such that the predetermined physical separation provides a level of isolation between the Tx signal path and the Rx signal path.

15. The full-duplex antenna system of claim 1, further comprising:
a substrate combining the Tx signal path and Rx signal path.

16. The full-duplex antenna system of claim 1, wherein a power amplifier of the one or more power amplifiers includes a phase control circuit configured to modify a phase of a Tx signal received from the Tx signal path, and a low-noise amplifier of the one or more low-noise amplifiers includes a phase control circuit configured to modify a phase of an Rx signal received from the Rx signal path.

17. The full-duplex antenna system of claim 1, wherein one of the filters of the first group of one or more filters and one of the filters of the second group of one or more filters are constructed from PCB traces, and wherein the PCB traces are disposed within a multilayered PCB.

18. The full-duplex antenna system of claim 1, further comprising an active cancellation circuit, the active cancellation circuit being interconnected to a power amplifier of the one or more power amplifiers and a low-noise amplifier of the one or more low-noise amplifiers.

19. A method for increasing isolation in full-duplex antenna systems, the method comprising:
providing a full-duplex antenna system, the full-duplex antenna system comprising:
a transmit (Tx) signal path comprising:
a Tx distribution network;
a beamforming Tx Radio-Frequency Integrated Circuit (RFIC), the Tx RFIC having outputs to one or more Tx ports of a Tx patch antenna, the beamforming Tx RFIC including a first amplitude control circuit and a first phase control circuit; and
a first group of one or more filtering structures;
wherein the Tx patch antenna being capable of operating at a Tx frequency band to transmit an outgoing signal to a satellite; and
a receive (Rx) signal path comprising:
an Rx distribution network;
a beamforming Rx Radio-Frequency Integrated Circuit (RFIC), the beamforming Rx RFIC having outputs to one or more Rx ports of a Rx patch antenna, the beamforming Rx RFIC including a second amplitude control circuit and a second phase control circuit;
a second group of one or more filtering structures;
wherein the Rx patch antenna being capable of operating at a Rx frequency band to receive an incoming signal from the satellite; and
one or more isolation structures interconnected between the Tx signal path and the Rx signal path;
wherein the Rx frequency band is separated by a guard band from the Tx frequency band; and
operating the full-duplex antenna system in a full-duplex mode, comprising:
providing filtering isolation on the Tx signal path using the first group of one or more filtering structures;
providing filtering isolation on the Rx signal path using the second group of one or more filtering structures; and
providing isolation between the Tx signal path and the Rx signal path using the one or more isolation structures.

20. The method of claim 19, wherein the first and second groups of filtering structures together with the isolation structures form an isolation between the Tx signal path and the Rx signal path, the isolation being greater than or equal to a threshold amount to allow the full-duplex antenna system to operate in the full-duplex mode.

21. The method of claim 20, wherein the Rx signal path comprises one or more low-noise amplifiers, and wherein the threshold amount being equal to a power level that is transmitted out of the full-duplex antenna system to the satellite at a highest determined frequency of the Rx frequency band minus a power level of a noise floor of the one or more low-noise amplifiers at a highest determined frequency of the Rx frequency band.

22. The method of claim 19, further comprising:
receiving, via the Tx distribution network, a first signal from a user device;
processing by the beamforming Tx RFIC the first signal and providing a first group of multiple processed output signals to the Tx patch antenna;
receiving and processing by the beamforming Rx RFIC a second group of multiple signals from the Rx patch antenna; and
combining, via the Rx distribution network, the second group of multiple signals into a single second signal and providing the second signal to the user device.

23. The method of claim 19, wherein providing the isolation between the Tx signal path and the Rx signal path comprises:
controlling, via the beamforming Tx RFIC, polarization of the Tx patch antenna by adjusting the amplitude and phase of a first electric field produced by the Tx patch antenna; and
controlling, via the beamforming Rx RFIC, polarization of the Rx patch antenna by adjusting the amplitude and phase of a second electric field produced by the Rx patch antenna.

24. The method of claim 23, wherein the first electric field and the second electric field are adjusted in an orthogonal polarization between the electric field of the Tx patch antenna and the Rx patch antenna; wherein the orthogonal polarization provides isolation between the Tx signal path and the Rx signal path.

25. The method of claim 19, wherein providing the isolation between the Tx signal path and the Rx signal path comprises:
determining a Tx signal that couples into the Rx signal path; and
introducing an antidote signal that is equal in amplitude and opposite in phase of the Tx signal that couples into the Rx signal path.

26. The method of claim 19, wherein the full-duplex antenna system further comprises:
an integral antenna component, the integral antenna component comprising a Tx patch antenna layer of the Tx patch antenna disposed above an Rx patch antenna layer of the Rx patch antenna; and
one or more internal parasitic structures disposed between the Tx patch antenna layer and the Rx patch antenna layer;
wherein providing the isolation between the Tx signal path and the Rx signal path comprises:
reducing, via the one or more internal parasitic structures, an amount of coupling of signal power between the Tx signal path and the Rx signal path.

27. The method of claim 19, wherein the full-duplex antenna system, further comprises:
a first group and a second group of integral antenna components, each of the first and second groups comprising:

one or more integral antenna components including the Tx patch antenna disposed above the Rx patch antenna; and one or more external parasitic structures disposed between the first group and second group of integral antenna components;

wherein providing the isolation between the Tx signal path and the Rx signal path comprises:

reducing, via the one or more external parasitic structures, an amount of coupling of signal power between the Tx signal path and the Rx signal path.

* * * * *